United States Patent
Ogawa et al.

(10) Patent No.: US 7,166,321 B2
(45) Date of Patent: Jan. 23, 2007

(54) PROCESS FOR THE PREPARATION OF AN OPTICAL COMPENSATORY SHEET COMPRISING CELLULOSE ESTER FILM, ORIENTATION LAYER, AND OPTICALLY ANISOTROPIC LAYER FORMED OF LIQUID CRYSTAL MOLECULES HAVING A FIXED ALIGNMENT

(75) Inventors: Masataka Ogawa, Kanagawa (JP); Kiyokazu Hashimoto, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/432,845

(22) PCT Filed: Dec. 4, 2001

(86) PCT No.: PCT/JP01/10586

§ 371 (c)(1),
(2), (4) Date: May 28, 2003

(87) PCT Pub. No.: WO02/46809

PCT Pub. Date: Jun. 13, 2002

(65) Prior Publication Data

US 2004/0052977 A1 Mar. 18, 2004

(30) Foreign Application Priority Data

Dec. 4, 2000 (JP) .............................. 2000-369004
Mar. 21, 2001 (JP) .............................. 2001-080749

(51) Int. Cl.
*B05D 5/06* (2006.01)

(52) U.S. Cl. ................... 427/162; 427/163.1; 427/164; 427/307; 427/308; 427/324; 427/353; 427/354; 427/402; 427/412.2; 349/75; 349/76; 349/117

(58) Field of Classification Search ............... 427/162, 427/163.1, 164, 307, 308, 324, 353, 354, 427/402, 412.2; 349/75, 76, 117
See application file for complete search history.

(56) References Cited

U.S. PATENT DOCUMENTS

| 4,626,495 | A | * | 12/1986 | Sakaguchi | 430/232 |
|---|---|---|---|---|---|
| 4,638,057 | A | * | 1/1987 | Takahashi et al. | 536/76 |
| 4,717,642 | A | * | 1/1988 | Watanabe et al. | 430/213 |
| 4,945,026 | A | * | 7/1990 | Tomiyama et al. | 430/233 |
| 5,134,036 | A | * | 7/1992 | Uemura et al. | 428/516 |
| 5,583,679 | A | * | 12/1996 | Ito et al. | 349/118 |
| 5,773,559 | A | * | 6/1998 | Miyamoto et al. | 528/353 |
| 6,074,964 | A | * | 6/2000 | Hara et al. | 442/118 |
| 6,162,864 | A | * | 12/2000 | Tanihara et al. | 525/60 |
| 6,503,581 | B1 | * | 1/2003 | Shibue et al. | 428/1.1 |
| 6,731,357 | B1 | * | 5/2004 | Tachibana et al. | 349/96 |

FOREIGN PATENT DOCUMENTS

| JP | 63-047759 A | * | 2/1988 |
|---|---|---|---|
| JP | 07-062120 A | * | 3/1995 |
| JP | 08-94838 A | | 4/1996 |
| JP | 11-23843 A | | 1/1999 |
| JP | 11-258425 A | | 9/1999 |
| JP | 2001-51274 A | | 2/2001 |
| JP | 2002-6138 A | | 1/2002 |
| JP | 2002-47357 A | | 2/2002 |
| WO | WO 01/09674 A1 | | 2/2001 |

OTHER PUBLICATIONS

JPO website English machine translation of JP 08-094838, Nakamura Taku, Apr. 1996.*

* cited by examiner

*Primary Examiner*—Alain L. Bashore
(74) *Attorney, Agent, or Firm*—Buchanan Ingersoll & Rooney PC

(57) ABSTRACT

An optical compensatory sheet comprises a cellulose ester film, an orientation layer and an optically anisotropic layer formed of liquid crystal molecules in this order. Alignment of the liquid crystal molecules is fixed. An alkaline solution is coated on a surface of the cellulose ester film to saponify the surface. The saponified surface is coated with a coating solution of the orientation layer.

5 Claims, No Drawings

PROCESS FOR THE PREPARATION OF AN OPTICAL COMPENSATORY SHEET COMPRISING CELLULOSE ESTER FILM, ORIENTATION LAYER, AND OPTICALLY ANISOTROPIC LAYER FORMED OF LIQUID CRYSTAL MOLECULES HAVING A FIXED ALIGNMENT

FIELD OF INVENTION

The present invention relates to an optical compensatory sheet comprising a cellulose ester film, an orientation layer and an optically anisotropic layer formed of liquid crystal molecules in this order, in which alignment of the liquid crystal molecules is fixed. The invention also relates to a process for preparation of the optical compensatory sheet. The invention further relates to a polarizing plate and a liquid crystal display using the optical compensatory sheet.

BACKGROUND OF INVENTION

A liquid crystal display generally comprises a liquid crystal cell, a polarizing plate and an optical compensatory sheet (phase retarder). In a display of transmission type, two polarizing plates are placed on both sides of the liquid crystal cell, and the optical compensatory sheet is provided between the cell and one or each of the polarizing plates. On the other hand, a display of reflection type comprises a reflection board, a liquid crystal cell, one optical compensatory sheet and one polarizing plate, in this order.

The liquid crystal cell comprises a pair of substrates, rod-like liquid crystal molecules and an electrode layer. The rod-like liquid crystal molecules are provided between the substrates, and the electrode layer has a function of applying a voltage to the rod-like liquid crystal molecules. According to alignment of the rod-like liquid crystal molecules in the cell, various display modes have been proposed. Examples of the display modes for transmission type include TN (twisted nematic) mode, IPS (in-plane switching) mode, FLC (ferroelectric liquid crystal) mode, OCB (optically compensatory bend) mode, STN (super twisted nematic) mode and VA (vertically aligned) mode. Examples of the modes for reflection type include HAN (hybrid aligned nematic) mode.

The polarizing plate generally comprises a pair of transparent protective films and a polarizing membrane provided between them. For preparing the polarizing membrane, a polyvinyl alcohol film is soaked with aqueous solution of iodine or a dichromatic dye, and is then uniaxially stretched.

The optical compensatory sheet is generally provided in various liquid crystal displays, to prevent displayed images from undesirable coloring and to enlarge a viewing angle of the liquid crystal cell. As the optical compensatory sheet, a stretched birefringent polymer film has been conventionally used.

Recently, in place of the stretched birefringent polymer film, an optical compensatory sheet comprising a transparent support and a thereon provided optically anisotropic layer formed from liquid crystal molecules (particularly, discotic liquid crystal molecules) has been proposed. The optically anisotropic layer is formed through the steps of aligning the liquid crystal molecules and then fixing the alignment. As the liquid crystal molecules, liquid crystal molecules having polymerizable groups are generally used. For fixing the alignment, they are polymerized. The liquid crystal molecules give large birefringence and have various alignment forms, and accordingly an optical compensatory sheet obtained from the liquid crystal molecules has a specific optical character that cannot be obtained from the conventional stretched birefringent polymer film.

The optical character of the optical compensatory sheet is designed according to that of the liquid crystal cell, namely, according to display mode of the liquid crystal cell. In fact, if an optical compensatory sheet is made with liquid crystal molecules (particularly, discotic liquid crystal molecules), various optical characteristics can be realized according to the display mode of the liquid crystal cell.

Various optical compensatory sheets using discotic liquid crystal molecules have been proposed according to liquid crystal cells of various display modes. For example, the optical compensatory sheet for liquid crystal cell of TN mode is described in Japanese Patent Provisional Publication No. 6(1994)-214116, U.S. Pat. Nos. 5,583,679, 5,646,703 and German Patent Publication No. 3,911,620A1. The compensatory sheet for liquid crystal cell of IPS or FLC mode is described in Japanese Patent Provisional Publication No. 10(1998)-54982. The compensatory sheet for OCB or HAN mode is described in U.S. Pat. No. 5,805,253 and International Patent Application No. WO96/37804. The compensatory sheet for STN mode is described in Japanese Patent Provisional Publication No. 9(1997)-26572. The compensatory sheet for VA mode is described in Japanese Patent No. 2,866,372.

In the optical compensatory sheet comprising a transparent support and a thereon-provided optically anisotropic layer formed from liquid crystal molecules, an orientation layer for controlling the alignment of liquid crystal molecules is provided between the support and the anisotropic layer. As the transparent support, a cellulose ester film is preferably used. In preparing the optical compensatory sheet, it is necessary to fix the orientation layer (normally, made of polyvinyl alcohol) closely on the cellulose ester film (transparent support).

However, the affinity between the cellulose ester film and polyvinyl alcohol (material of the orientation layer) is so poor that the interface is easily cracked or broken, and hence the optically anisotropic layer on the orientation layer easily comes off from the film (support). Particularly when the optical compensatory sheet is cut (or punched out) to size for the display, the orientation layer (together with the optically anisotropic layer) is shocked and thereby often partly peeled from the film. At that time, fragments of the peeled orientation layer (and the peeled optically anisotropic layer) are scattered and dusted on the film, and consequently cause "undesirable brilliant points" in a displayed image. The term "undesirable brilliant points" means defects undesirably sparking on a screen of liquid crystal display. In order to avoid the undesirable brilliant points (i.e., in order to enhance the adhesion between the cellulose ester film and the orientation layer), the cellulose ester film has been immersed in an alkaline solution to saponify the surface of the film or otherwise an undercoating layer made of gelatin has been provided on the film. Japanese Patent Provisional Publication No. 8(1996)-94838 describes saponification treatments of the cellulose ester film.

SUMMARY OF INVENTION

If the cellulose ester film is immersed in an alkaline solution so that the surface may be saponified enough to enhance the adhesion between the film and the orientation layer, not only the aimed surface but also the opposite surface is saponified at the same time. Therefore, when the thus-treated film is wound up into a roll, the top surface often sticks to the bottom surface in the roll. In addition, the process of immersing for saponification is hardly carried out simultaneously with the step of applying hydrophilic material (such as the coating solution for forming the orientation layer), and hence the immersing process must be performed independently of the coating for forming the orientation layer. As a result, the saponification treatment relatively costs a lot.

On the other hand, for providing a gelatin-undercoating layer on the cellulose ester film to enhance the adhesion between the film and the orientation layer, a coating solution for forming the undercoating layer is generally used. The coating solution contains a solvent in which cellulose ester is easily swollen (e.g., a ketone), and hence often impairs smoothness of the film surface even though the adhesion between the film and the orientation layer is improved. As a result, striped unevenness is liable to appear in the longitudinal direction of the film, and accordingly causes unevenness of displaying to make the quality of displayed images worse when the film is used in a liquid crystal display.

As described above, it has been wanted to improve the adhesion between the cellulose ester film and the orientation layer without any trouble (for example, without sticking of the film in a roll) while the film surface is kept smooth.

It is an object of the present invention to provide an optical compensatory sheet having an excellent surface and having an orientation layer fixed closely on a support film with improved adhesion.

Also, it is another object of the invention to provide a process for preparation of the above compensatory sheet.

Further, it is a further object of the invention to provide a polarizing plate in which the above compensatory sheet is unified with a polarizing membrane.

Furthermore, it is a furthermore object of the invention to provide a liquid crystal display comprising the above compensatory sheet and thereby improved in avoiding unevenness of displaying and undesirable brilliant points.

The present invention provides an optical compensatory sheet comprising a cellulose ester film, an orientation layer and an optically anisotropic layer formed of liquid crystal molecules in this order, alignment of said liquid crystal molecules being fixed, wherein an alkaline solution is coated on a surface of the cellulose ester film to saponify the surface, and wherein the saponified surface is coated with a coating solution of the orientation layer.

The invention also provides a process for preparation of an optical compensatory sheet comprising a cellulose ester film, an orientation layer and an optically anisotropic layer formed of liquid crystal molecules in this order, alignment of said liquid crystal molecules being fixed, wherein the process successively comprises the steps of: coating an alkaline solution on a surface of the cellulose ester film; washing the surface to remove the alkaline solution; coating a coating solution of the orientation layer on the washed surface; and drying the coating solution to form the orientation layer.

The invention further provides a polarizing plate comprising two transparent protective films and a polarizing membrane placed between the protective films, wherein one of the protective films is an optical compensatory sheet comprising a cellulose ester film, an orientation layer and an optically anisotropic layer formed of liquid crystal molecules in this order, alignment of said liquid crystal molecules being fixed, wherein an alkaline solution is coated on a surface of the cellulose ester film to saponify the surface, and wherein the saponified surface is coated with a coating solution of the orientation layer.

The invention furthermore provides a liquid crystal display having two polarizing plates and a liquid crystal cell provided between the plates, wherein the polarizing plate comprises two transparent protective films and a polarizing membrane placed between the protective films, and wherein at least one of the two protective films placed between the liquid crystal cell and the polarizing membranes is an optical compensatory sheet comprising a cellulose ester film, an orientation layer and an optically anisotropic layer formed of liquid crystal molecules in this order, alignment of said liquid crystal molecules being fixed, wherein an alkaline solution is coated on a surface of the cellulose ester film to saponify the surface, and wherein the saponified surface is coated with a coating solution of the orientation layer.

In the present specification, the term "essentially at 45°" means the noticed angle is in the range of the strict angle±5°. The allowance is preferably less than ±4°, more preferably less than ±3°, most preferably less than ±2°. The term "slow axis" means the direction giving the maximum refractive index. The term "fast axis" means the direction giving the minimum refractive index. The term "transmission axis" means the directions giving the maximum transmittance.

The present inventors have succeeded in providing an optical compensatory sheet having an excellent surface and having an orientation layer fixed closely on a support film with improved adhesion. The compensatory sheet comprises a cellulose ester film as the support, and only one surface of the film is selectively saponified. For the selective saponification, an alkaline solution is applied on the aimed surface of the film.

Since the saponification treatment is performed through a coating procedure, only the aimed surface is selectively saponified so that the adhesion between the film and the orientation layer can be improved without troubles such as sticking of the film in a roll. In addition, since it is not necessary to provide a gelatin-undercoating layer, the film surface can be kept smooth.

Further, since it takes relatively short time to perform the coating procedure for saponification, the saponification procedure can be carried out successively after the coating solution for forming the orientation layer is applied. Consequently, the production cost of the optical compensatory sheet is lowered.

In producing a polarizing plate in which the compensatory sheet is unified with a polarizing membrane, the polarizing membrane-facing surface of the cellulose ester film can be also selectively saponified through the coating procedure. This means that the conventional immersing saponification treatment can be omitted and accordingly that the productivity can be improved to lower the production cost.

A TFT liquid crystal display of TN mode is often equipped with a unified elliptically polarizing plate in which the transparent support of the optical compensatory sheet comprising liquid crystal molecules serves as one of the protective films for the polarizing plate. That liquid crystal display thermally deforms, and is liable to give an image with leaked light. The thermal deformation changes optical characters of the optical compensatory sheet, and consequently causes the light-leakage. Particularly, a film of polymer having hydroxyl groups (such as a cellulose ester film) is largely affected by the environmental conditions. For reducing the light-leakage caused by the thermal deformation, the inventors have found that it is effective to lower the photo-elasticity of the optical compensatory sheet and particularly to thin down the cellulose ester film.

However, the inventors have also found that it is difficult to handle the thin cellulose ester film when the gelatin-undercoating layer is provided through a coating procedure.

If the optical compensatory sheet is produced according to the process of the invention, it is not necessary to provide the gelatin-undercoating layer. Accordingly, the process of the invention is also effective in producing the thin optical compensatory sheet having excellent planeness.

Further, the process for selectively saponifying only one surface of the cellulose ester film is yet also effective in producing the protective film of the polarizing plate.

DETAILED DESCRIPTION OF INVENTION (Optical Character of Cellulose Ester Film)

The optical character of cellulose ester film is controlled according to the mode (kind) of liquid crystal cell on which the resultant optical compensatory sheet is provided.

If the cellulose ester film is required to have optical anisotropy, it preferably exhibits high retardation.

The film may be stretched to control (increase) the retardation value in the plane (Re retardation value).

On the other hand, the retardation value along the thickness (Rth retardation value) can be controlled (increased) (1) with a retardation-increasing agent or (2) through the cooling dissolution method. If the cellulose ester film is made of cellulose acetate, the Rth value can be controlled by the average acetic acid content (acetylation degree). Since the retardation values can be thus increased, the cellulose ester film (which has been conventionally regarded as an optically isotropic film) can be used as an optically anisotropic film having an optically compensatory function. In fact, the thus-prepared optically anisotropic cellulose ester film can optically compensate the liquid crystal cell cooperatively with the optical anisotropic layer provided thereon.

The optically anisotropic cellulose ester film has an Re retardation value preferably in the range of −50 to 50 nm, more preferably in the range of −20 to 20 nm.

The Rth retardation value of the anisotropic cellulose ester film is preferably in the range of 60 to 1,000 nm.

The retardation value in the plane (Re) is a product of the birefringence in the plane and the thickness of the film, and that along the thickness (Rth) is a product of the birefringence in the thickness direction and the thickness of the film. The concrete Re value can be obtained by measurement in which an incident ray (e.g., ray emitted from He-Ne laser [wavelength: 632.8 nm]) is perpendicularly applied onto the film surface, and the concrete Rth value can be obtained by measurement in which incident rays (e.g., rays emitted from He-Ne laser [wavelength: 632.8 nm]) are obliquely applied onto the film surface. In the measurement, an ellipsometer (e.g., M-150, JASCO COOPORATION) is used to obtain data, which are then extrapolated to find the retardation values.

The retardation values in the plane (Re) and along the thickness (Rth) are calculated according to the following formulas (1) and (2), respectively.

$$Re = (nx - ny) \times d \quad (1)$$

$$Rth = [\{(nx+ny)/2\} - nz] \times d. \quad (2)$$

In the formulas, nx is a refractive index along the slow axis in the film plane, ny is a refractive index along the fast axis in the film plane, nz is a refractive index in the thickness direction of the film, and d is the thickness of the film in terms of nm.

(Cellulose Ester)

The cellulose ester has a (viscosity average) polymerization degree of preferably 200 to 700, more preferably 250 to 550, most preferably 250 to 350. The viscosity average polymerization degree can be measured with an Ostwald's viscometer. Form the measured specific viscosity [η], the viscosity average polymerization degree DP is calculated according to the formula: DP=[η]/Km in which Km is a constant $6 \times 10^{-4}$.

The cellulose ester may be prepared only from virgin flakes, but wastes of used cellulose ester films are preferably mixed to reuse. The amount of the wastes is in the range of 3 to 95 wt. %, preferably in the range of 6 to 80 wt. %, more preferably in the range of 10 to 70 wt. %.

As the cellulose ester, cellulose esters of lower fatty acids are preferred. The term "lower fatty acids" means fatty acids having 6 or less carbon atoms. The number of carbon atoms is preferably 2 (cellulose acetate), 3 (cellulose propionate) or 4 (cellulose butyrate). Cellulose acetate is particularly preferred, and cellulose esters of mixed fatty acids such as cellulose acetate propionate and cellulose acetate butyrate are also usable.

The average acetic acid content (acetylation degree) of cellulose acetate is preferably in the range of 55.0 to 62.5%. In consideration of the film properties, the average acetic acid content is more preferably in the range of 58.0 to 62.5%. However, the film of cellulose acetate having an average acetic acid content of 55.0 to 58.0% (preferably 57.0 to 58.0%) exhibits a high retardation value along the thickness.

(Retardation-Increasing Agent)

A retardation-increasing agent may be incorporated into the cellulose ester film, to increase the retardation value along the thickness. As the retardation-increasing agent, an aromatic compound having a molecular structure in which at least two aromatic rings are included and their conformations do not suffer steric hindrance can be used.

The aromatic compound is added in an amount of 0.01 to 20 weight parts, preferably in an amount of 0.05 to 15 weight parts, more preferably in an amount of 0.1 to 10 weight parts, based on 100 weight parts of the cellulose ester. Two or more aromatic compounds may be used in combination.

The term "an aromatic ring" means not only an aromatic hydrocarbon ring but also an aromatic heterocyclic ring.

As the aromatic hydrocarbon ring, a six-membered ring (namely, a benzene ring) is particularly preferred.

The aromatic heterocyclic ring is generally unsaturated. The aromatic heterocyclic ring is preferably a five-, six- or seven-membered ring, and more preferably a five- or six-membered ring. The aromatic heterocyclic ring generally has double bonds as many as possible. The hetero atom in the ring preferably is nitrogen atom, sulfur atom or oxygen atom, and more preferably is nitrogen atom. Examples of the aromatic heterocyclic ring include furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and 1,3,5-triazine ring.

The retardation-increasing agent preferably has a molecular weight of 300 to 800. The boiling point of the retardation-increasing agent is preferably 260° C. or more. The boiling point can be measured by means of a commercially available apparatus (e.g., TG/DTA100, SEIKO Instruments Inc.).

Concrete examples of the retardation-increasing agent are described in Japanese Patent Provisional Publication Nos. 2000-111914, 2000-275434 and PCT/JP 00/02619.

(Preparation of Cellulose Ester Film)

The cellulose ester film in the invention is preferably prepared according to the solvent cast method. In the solvent cast method, a solution (dope) in which the polymer is dissolved in an organic solvent is used. The organic solvent preferably contains a main solvent selected from the group consisting of an ether having 3 to 12 carbon atoms, a ketone having 3 to 12 carbon atoms, an ester having 3 to 12 carbon atoms and a halogenated hydrocarbon having 1 to 7 carbon atoms.

The ether, the ketone or the ester may have a cyclic structure. A compound having two or more functional groups of ether, ketone and ester (—O—, —CO— and —COO—) is also usable as the solvent. The organic solvent may have other functional groups such as alcoholic hydroxyl. If the solvent is the compound having two or more functional groups, the number of carbon atoms is in any of the above ranges.

Examples of the ether having 3 to 12 carbon atoms include diisopropyl ether, dimethoxymethane, 1,4-dioxane, 1,3-dioxolane, tetrahydrofuran, anisole and phenetol.

Examples of the ketone having 3 to 12 carbon atom include acetone, methyl ethyl ketone, diethyl ketone, diisobutyl ketone, cyclopentanone, cyclohexanone and methylcyclohexanone.

Examples of the ester having 3 to 12 carbon atoms include ethyl formate, propyl formate, pentyl formate, methyl acetate, ethyl acetate, and pentyl acetate.

Examples of the compounds having two or more functional groups include 2-ethoxyethyl acetate, 2-methoxyethanol and 2-butoxyethanol.

A representative halogenated hydrocarbon having 1 to 7 carbon atoms is methylene chloride. From the technical viewpoint, the halogenated hydrocarbon such as methylene chloride can be used without any problem. However, in consideration of the global environment and working conditions, the organic solvent preferably contains essentially no halogenated hydrocarbon. This means that the organic solvent preferably contains halogenated hydrocarbon in an amount of less than 5 wt. % (more preferably less than 2 wt. %). Also preferably, halogenated hydrocarbon such as methylene chloride is not found in the resultant film at all.

Two or more organic solvents can be used in combination. It is particularly preferred to use a mixture of at least three different kinds of solvents. The first solvent is preferably selected from the group consisting of a ketone having 3 or 4 carbon atoms, an ester having 3 or 4 carbon atoms, and a mixture thereof. The second solvent is preferably selected from the group consisting of a ketone having 5 to 7 carbon atoms, an acetoacetic ester, and a mixture thereof. The third solvent is preferably selected from the group consisting of an alcohol having a boiling point of 30 to 170° C., a hydrocarbon having a boiling point of 30 to 170° C., and a mixture thereof.

Examples of the ketone and the ester usable as the first solvent include acetone, methyl acetate, methyl formate, and ethyl formate.

Examples of the second solvent include cyclopentanone, cyclohexanone, and methyl acetylacetate.

The third solvent is preferably selected from the group consisting of an alcohol having a boiling point of 30 to 170° C., a hydrocarbon having a boiling point of 30 to 170° C., and a mixture thereof. The alcohol is preferably monohydric. The hydrocarbon moiety of the alcohol may have a straight-chain structure, a branched-chain structure, or a cyclic structure. The hydrocarbon moiety of the alcohol is preferably a saturated aliphatic hydrocarbon. The alcohol may be primary, secondary or tertiary. Examples of the alcohol include methanol (boiling point: 64.65° C.), ethanol (b.p.: 78.325° C.), 1-propanol (b.p.: 97.15° C.), 2-propanol (b.p.: 82.4° C.), 1-butanol (b.p.: 117.9° C.), 2-butanol (b.p.: 99.5° C.), t-butanol (b.p.: 82.45° C.), 1-pentanol (b.p.: 137.5° C.), 2-methyl-2-butanol (b.p.: 101.9° C.), and cyclohexanol (b.p.: 161° C.). These alcohols are preferably used in a combination of two or more. The hydrocarbon may have a straight-chain structure, a branched-chain structure, or a cyclic structure. The hydrocarbon may be either aliphatic or aromatic. The hydrocarbon may be either saturated or unsaturated. Examples of the hydrocarbon include cyclohexane (boiling point: 80.7° C.), hexane (b.p.: 69° C.), benzene (b.p.: 80.1° C.), toluene (b.p.: 110.6° C.), and xylene (b.p.: 138.4 to 144.4° C.).

The mixed solvent of the above three different kinds of solvents preferably contains the first solvent, the second solvent and the third solvent in amounts of 30 to 95 wt. %, 1 to 40 wt. %, and 1 to 40 wt. %, respectively. The content of the first solvent is more preferably in the range of 40 to 90 wt. %, further preferably in the range of 50 to 90 wt. %, and most preferably in the range of 50 to 85 wt. %. The content of each of the second and third solvents is more preferably in the range of 3 to 30 wt. %. Examples of the ratio among the solvents and cellulose ester in the dope are as follows:

cellulose ester/methyl acetate/cyclohexanone/methanol/ethanol=X/(70−X)/20/5/5 (by weight), cellulose ester/methyl acetate/methyl ethyl ketone/acetone/methanol/ethanol=X/(50−X)/20/20/5/5 (by weight), cellulose ester/acetone/methyl acetoacetate/ethanol=X/(75−X)/20/5 (by weight), cellulose ester/methyl acetate/cyclopentanone/methanol/ethanol=X/(80−X)/10/5/5 (by weight), cellulose ester/methyl acetate/1,3-dioxolane/methanol/ethanol=X/(70−X)/20/5/5 (by weight), cellulose ester/methyl acetate/dioxane/acetone/methanol/ethanol=X/(60−X)/20/10/5/5 (by weight), and cellulose ester/methyl acetate/1,3-dioxolane/cyclohexanone/methyl ethyl ketone/methanol/ethanol=X/(55−X)/20/10/7.5/7.5 (by weight).

In the above, X represents the amount of cellulose ester in terms of weight part and is preferably in the range of 10 to 25, more preferably in the range of 15 to 23.

Besides the above solvents, the dope (cellulose ester solution) for forming the cellulose ester film may contain fluoro-alcohol or methylene chloride in an amount of 10 wt. % or less based on the total weight of the organic solvents, in order to improve the transparency of the film and to make the cellulose ester more quickly dissolved in the dope.

The fluoro-alcohol has a boiling point of preferably 165° C. or less, more preferably 111° C. or less, most preferably 80° C. or less. The fluoro-alcohol has preferably 2 to 10, more preferably 2 to 8 carbon atoms. The fluoro-alcohol is a fluorine-containing aliphatic alcohol that may have a substituent group. Examples of the substituent group include an aliphatic group that may contain fluorine and an aromatic group.

Examples of the fluoro-alcohol include 2-fluoroethanol (boiling point: 103° C.), 2,2,2-trifluoroethanol (b.p.: 80° C.), 2,2,3,3-tetrafluoro-1-propanol (b.p.: 109° C.), 1,3-difluoro-2-propanol (b.p.: 55° C.), 1,1,1,3,3,3-hexa-2-methyl-2-propanol (b.p.: 62° C.), 1,1,1,3,3,3-hexafluoro-2-propanol (b.p.:

59° C.), 2,2,3,3,3-pentafluoro-1-propanol (b.p.: 80° C.), 2,2,3,4,4,4-hexafluoro-1-butanol (b.p.: 114° C.), 2,2,3,3,4,4,4-heptafluoro-1-butanol (b.p.: 97° C.), perfluoro-tert-butanol (b.p.: 45° C.), 2,2,3,3,4,4,5,5-octfluoro-1-pentanol (b.p.:142° C.), 2,2,3,3,4,4-hexafluoro-1,5-pentanediol (b.p.: 111.5° C.), 3,3,4,4,5,5,6,6,7,7,8,8,8-tridecafluoro-1-octanol (b.p.: 95° C.), 2,2,3,3,4,4,5,5,6,6,7,7,8,8,8-pentadecafluoro-1-octanol (b.p.: 165° C.), 1-(pentafluorophenyl)ethanol (b.p.: 82° C.), and 2',3,4,5,6-pentafluorobenzyl alcohol (b.p.: 115° C.). Two or more fluoro-alcohols may be mixed to use in combination.

The cellulose ester solution (dope) is prepared according to the cooling dissolution method or the high-temperature dissolution method.

The cooling dissolution method is explained below.

At the first stage of the cooling dissolution method, cellulose ester is gradually added to the main solvent and stirred at room temperature (−10 to 40° C.). If the main solvent is a mixture consisting of two or more solvent components, the cellulose ester may be dissolved in the mixture. Otherwise, the cellulose ester may be dissolved in one of the solvent components and then other solvent components may be added to prepare the mixture. For example, after the cellulose ester is swollen with a gelling solvent such as alcohol, the other solvent components are added. If so, the cellulose ester can be prevented from inhomogeneous dissolution. Thus, a mixture of organic solvent and cellulose ester is prepared.

The amount of cellulose ester in the mixture is preferably in the range of 10 to 40 wt. %, more preferably in the range of 10 to 30 wt. %. Various additives described below may be added in the mixture.

The prepared mixture is then cooled to a temperature of −100 to −10° C., preferably −80 to −10° C., more preferably −50 to −20° C., most preferably −50 to −30° C. The cooling procedure can be carried out, for example, with dry ice-methanol bath (−75° C.) or with cooled ethylene glycol solution (−30 to −20° C.). Through the cooling procedure, the mixture is solidified. There is no particular restriction on the cooling rate. If the cooling procedure is carried out in a batchwise operation, the viscosity of the mixture increases according as it is getting colder. The more viscous the mixture becomes, the worse the cooling efficiency becomes. Accordingly, the pot in which the mixture is charged must have such an excellent cooling efficiency that the aimed cooling temperature can be realized. The aimed cooling temperature can be achieved in a short time by means of a generally used cooling apparatus.

The cooling rate is preferably 4° C./minute or more, more preferably 8° C./minute or more, and most preferably 12° C./minute or more. The cooling rate is preferably as fast as possible. However, a theoretical upper limit of the cooling rate is 10,000° C./second, a technical upper limit is 1,000° C./second, and a practical upper limit is 100° C./second. The cooling rate means the change of temperature at the cooling step per the time taken to complete the cooling step. The change of temperature means the difference between the temperature at which the cooling step is started and the temperature at which the cooling step is completed.

The cooled mixture is then warmed to a temperature of 0 to 200° C., preferably 0 to 150° C., more preferably 0 to 120° C., most preferably 0 to 50° C. Through the warming procedure, the cellulose ester is dissolved in the organic solvent. For warming, the mixture may be left at room temperature or may be heated in a warm bath.

The warming rate is 4° C./minute or more, more preferably 8° C./minute or more, and most preferably 12° C./minute or more. The warming rate is preferably as fast as possible. However, a theoretical upper limit of the cooling rate is 10,000° C./second, a technical upper limit is 1,000° C./second, and a practical upper limit is 100° C./second. The warming rate means the change of temperature at the warming step per the time taken to complete the warming step. The change of temperature means the difference between the temperature at which the warming step is started and the temperature at which the warming step is completed.

The warming procedure may be performed under a pressure of 0.3 to 30 Mpa. If so, the procedure can be completed in a relatively short time. The time is preferably in the range of 0.5 to 60 minutes, more preferably in the range of 0.5 to 2 minutes.

Thus, a homogeneous solution can be prepared. If the cellulose ester is not sufficiently dissolved, the cooling and warming procedures may be repeated. It can be judged by observation with the eyes whether the cellulose ester is sufficiently dissolved or not.

In the process of cooling dissolution method, a sealed vessel is preferably used to prevent contamination of water, which may be caused by dew condensation at the cooling step. Further, the mixture may be cooled under an elevated pressure and warmed under a reduced pressure so that the time taken to complete the cooling and warming steps can be shortened, and hence a vessel resisting pressure is preferably used to conduct the procedure under an elevated or reduced pressure.

The cellulose ester solution (dope) can be also prepared according to the high-temperature dissolution method.

In the high-temperature dissolution method, cellulose ester is gradually added to the main solvent and stirred at room temperature (−10 to 40° C.). If the main solvent is a mixture consisting of two or more solvent components, the cellulose ester may be dissolved in the mixture. Otherwise, the cellulose ester may be dissolved in one of the solvent components and then other solvent components may be added to prepare the cellulose ester mixture. For example, after the cellulose ester is swollen with a gelling solvent such as alcohol, the other solvent components are added. If so, the cellulose ester can be prevented from inhomogeneous dissolution.

Prior to the preparation of the cellulose ester mixture, the cellulose ester is preferably beforehand swollen with the mixed organic solvent or a gelling solvent such as alcohol. For example, the cellulose ester is stirred and gradually added to the solvent at a temperature of −10 to 40° C., or otherwise the cellulose ester is swollen with one solvent component and then other solvent components are mixed, to prepare a homogeneous swollen mixture. The cellulose ester may be swollen with two or more solvent components, and then other solvent components may be mixed to prepare the swollen mixture. The thus-prepared swollen mixture may be mixed in the main solvent to prepare a mixed solution.

The mixed solution preferably contains the cellulose ester in an amount of 40 wt. % or less. In consideration of drying efficiency in forming the film, the content of cellulose ester is as high as possible. The content of cellulose ester is adjusted so that the resultant dope contains the cellulose ester in an amount of 10 to 40 wt. %. The resultant dope preferably contains the cellulose ester in a high content. However, if the cellulose ester is so thickly contained that the viscosity of the dope increases, troubles are liable to occur in forming the film. Accordingly, the content of cellulose ester in the resultant dope is preferably in the range of 15 to 30 wt. %, more preferably in the range of 17 to 25 wt. %.

In the high-temperature dissolution method, a sealed vessel is used in order to prevent the solvent from evaporation. Further, the swelling procedure may be performed under a reduced or elevated pressure to shorten the time to complete the procedure. For the procedure under a reduced or elevated pressure, a vessel resisting pressure is used.

The thus-obtained cellulose ester mixture is then heated to 70 to 240° C. (preferably, 80 to 220° C., more preferably 100 to 200° C., most preferably 100 to 190° C.) under an elevated pressure of 0.2 to 30 Mpa. During this heating procedure under an elevated pressure, the mixture is preferably stirred. Thus, a solution in which cellulose ester is homogeneously dissolved is obtained.

There is no particular restriction on the methods for heating and elevating the pressure. For example, after the mixture is charged in a vessel, the pressure in the vessel can be elevated by introducing an inert gas into the vessel, or by heating and evaporating the solvent to increase the vapor pressure.

The vessel is preferably heated from outside. For example, a jacket heater is preferably used. Otherwise, liquid heated with a plate-heater placed outside of the vessel may be circulated through a pipe wound around the vessel, to heat the whole vessel.

The mixture is preferably stirred with a propeller mixer provided in the vessel. The wing of the propeller preferably has a length reaching the inside wall of the vessel. Further, at the tip of the wing, a scratching mean is preferably provided to scratch and renew the liquid attached on the inside wall.

The heated mixture must be cooled to a temperature below the lowest of the boiling points of the solvent components. For cooling the mixture, the vessel may be left at room temperature or preferably cooled with cooling water.

The above warming and cooling procedures may be repeated to promote the dissolution of cellulose ester. It can be judged by observation with the eyes whether the cellulose ester is sufficiently dissolved or not.

In preparing the cellulose ester solution, the vessel may be filled with an inert gas such as nitrogen gas. The viscosity of cellulose acetate solution immediately before the film-forming process is adjusted so that the solution can be cast to form the film, and is normally in the range of 10 to 2,000 ps·s, preferably in the range of 30 to 400 ps·s. If the solution is prepared according to the high-temperature dissolution method under an elevated pressure, a sealed vessel is used to prevent the solvent from evaporation. Further, the swelling procedure may be performed under a reduced or elevated pressure to shorten the time to complete the procedure. For the procedure under a reduced or elevated pressure, a pressure-resisting vessel or a pressure-resisting production line is indispensable.

From the thus-prepared cellulose ester solution, the film is formed. The film-forming procedure may be performed according to the conventional solvent cast method by means of a common apparatus.

At the first stage of the film-forming procedure, the prepared dope (cellulose ester solution) is settled in a storing tank to remove bubbles.

The dope is then sent to a pressure-die by means of, for example, a constant-pressure gear pump, which can send the dope in an amount precisely controlled by rotation of the gear. From the pressure-die, the dope is evenly cast onto an endlessly running support. When the support turns around almost once and the releasing point appears, the half-dried dope film (referred to as "web") is peeled. Both sides of the web were held with clips to keep the width, and the web is dried and transferred with a tenter. The web is then wound up in a predetermined length by means of a winding machine. The apparatus for the solvent cast method is often equipped with a coating means by which additional layers such as a subbing layer, an anti-static layer, an anti-halation layer and a protective film are provided on the film surface. Examples of the film-forming procedure are described below, but they by no means restrict the invention.

According to the solvent cast method, the prepared cellulose ester solution (dope) is cast on a drum or a band, and the solvent is evaporated to form a film. The solid content of the dope is preferably controlled in the range of 10 to 40%. The surface of the drum or band is preferably beforehand polished to be a mirror. The casting and drying steps of the solvent cast method are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035. The surface temperature of the drum or band is preferably 10° C. or below.

The dope may be singly cast onto a support such as the drum or the band, to form a single layer. Otherwise, two or more dopes may be prepared, and from them two or more layers may be formed to prepare a layered film.

In the case where two or more cellulose ester solutions are cooperatively cast, two or more nozzles are arranged at intervals along the running direction of the support, and from each nozzle each polymer solution is cast to form a layered film (Japanese Patent Provisional Publication Nos. 61(1986)-158414, 1(1989)-122419 and 11(1999)-198285). Otherwise, polymer solutions may be cast from two nozzles to form a film (Japanese Patent Publication No. 60(1985)-27562, Japanese Patent Provisional Publication Nos. 61(1986)-94724, 61(1986)-947245, 61(1986)-104813, 61(1986)-158413 and 6(1994)-134933). Further, a flow of high-viscous polymer solution may be enclosed with a flow of low-viscous one to form a layered flow, and the high- and low-viscous solutions in the layered flow may be simultaneously extruded to produce a film (Japanese Patent Provisional Publication No. 56(1981)-162617).

Further, the method disclosed in Japanese Patent Publication No. 44(1969)-20235 may be adopted. In the disclosed process, a dope is cast on the support from one nozzle to form a film. After peeled from the support, the formed film is turned over and again placed on the support. On the thus appearing surface (having been in contact with the support), another dope is cast from another nozzle to form a film.

The used cellulose ester solutions may be the same or different from each other. The function of each formed cellulose ester layer can be given by each corresponding solution extruded from each nozzle.

Other functional layers (e.g., adhesive layer, dye layer, antistatic layer, anti-halation layer, UV absorbing layer, polarizing layer) can be simultaneously formed together with the cellulose ester layer.

In a conventional single layer preparation process, it is necessary to extrude a cellulose ester solution having such high concentration and such high viscosity that the resultant film may have the aimed thickness. Accordingly, that solution is often so unstable that solid contents are deposited to cause troubles and to impair the planeness. To avoid the problem, plural concentrated solutions are simultaneously extruded from nozzles onto the support. The thus-prepared thick film has excellent planeness. In addition, since the concentrated solutions are used, the film is so easily dried that the productivity (particularly, production speed) can be improved.

(Additives)

A plasticizer can be added into the dope to enhance mechanical strength of the resultant film or to shorten the time for drying. The plasticizer is, for example, a phoshate ester or a carbonate ester. Examples of the phosphate ester used as the plasticizer include triphenyl phosphate (TPP) and tricresyl phosphate (TCP). Typical examples of the carbonate ester are phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrate esters include triethyl o-acetylcitrate (OACTE) and tributyl o-acetylcitrate (OACTB). Besides the above, butyl oleate, methylacetyl ricinolate, dibutyl sebacate and various trimellitic esters are also usable. The plasticizers of phosphate esters (DMP, DEP, DBP, DOP, DPP, DEHP) are preferred. Particularly preferred are DEP and DPP.

The content of the plasticizer is preferably in the range of 0.1 to 25 wt. %, more preferably in the range of 1 to 20 wt. %, most preferably in the range of 3 to 15 wt. % based on the amount of cellulose ester.

Further, a deterioration inhibitor (e.g., oxidation inhibitor, peroxide decomposer, radical inhibitor, metal inactivating agent, oxygen scavenger, amine) may be incorporated in the cellulose ester film. The deterioration inhibitor is described in Japanese Patent Provisional Publication Nos. 3(1991)-199201, 5(1993)-1907073, 5(1993)-194789, 5(1993)-271471 and 6(1994)-107854. The content of the deterioration inhibitor is preferably in the range of 0.01 to 1 wt. %, more preferably in the range of 0.01 to 0.2 wt. % based on the amount of the dope. If the content is less than 0.01 wt. %, the deterioration inhibitor gives little effect. If the content is more than 1 wt. %, the inhibitor often oozes out (bleeds out) to appear on the surface of the film. Particularly preferred deterioration inhibitors are butylated hydroxytoluene (BHT) and tribenzylamine (TBA). Japanese Patent Provisional Publication No. 7(1995)-11056 describes UV absorbers.

A cellulose acetate having an average acetic acid content of 55.0 to 58.0 is inferior to one having an average acetic acid content of 58.0 or more in the stability of the prepared dope and in the properties of the resultant film. However, these defects can be essentially cancelled out with the aforementioned deterioration inhibitor, particularly butylated hydroxytoluene (BHT).

(Stretching Procedure)

The cellulose ester film is preferably stretched at least in one direction parallel to the film surface. Preferably, the film is stretched in the longitudinal direction (MD) or in the lateral direction (TD). The stretching may be longitudinally uniaxial, laterally uniaxial, or in a combination thereof (i.e., multi-axial). The stretching (extension) ratio is in the range of 1 to 2, preferably in the range of 1 to 1.8, more preferably in the range of 1 to 1.6. The film immediately before stretching contains the solvent in an amount of 0 to 50 wt. %. For the longitudinal stretching, the content of the solvent is preferably in the range of 0 to 10 wt. %, more preferably in the range of 0 to 5 wt. %. For the lateral stretching, the content is preferably in the range of 5 to 45 wt. %, more preferably in the range of 10 to 40 wt. %.

(1) Longitudinal Stretching

The longitudinal stretching can be performed by means of two series of nipping rolls arranged at intervals. The rolls near the outlet are made to rotate more quickly than those near the inlet, to stretch the film longitudinally. The stretching speed is preferably in the range of 50 to 1,000%/minute, more preferably in the range of 80 to 800%/minute, most preferably in the range of 100 to 700%/minute. The temperature at which the film is stretched (hereinafter, referred to as "stretching temperature) is preferably in the range of Tg (glass transition temperature of the film)–120° C. to Tg+50° C., more preferably in the range of Tg–110° C. to Tg+30° C. For heating the film, the film may be made to contact with a heating roll, stretched in a thermostatic bath, or exposed to an IR or halogen heater. These heating means may be used in combination.

For preventing the film from wrinkling, the film is preferably preheated before stretching and gradually cooled after stretching. The film may be preheated either stepwise or continuously. In the stepwise preheating, the film is heated and kept for 1 second to 3 minutes at one or more temperatures between room temperature and the stretching temperature, and then heated to the stretching temperature. In the continuous preheating, the film is continuously heated from room temperature to the stretching temperature at a rate of 10 to 1,000° C./minute. It is also preferred to combine these preheating methods. The heated film after stretched is gradually cooled from the stretching temperature to room temperature. The film may be cooled either stepwise or continuously. In the stepwise cooling, the film is cooled and kept for 1 second to 3 minutes at one or more temperatures between the stretching temperature and room temperature, and then cooled to room temperature. In the continuous cooling, the film is continuously cooled from the stretching temperature to room temperature at a rate of –10 to –1,000° C./minute. It is also preferred to combine these cooling methods. Further, to improve the film surface, the film is preferably subjected to additional stretching at an extension ratio of 0 to 10%. In contrast, it is also preferred to relax the film at a ratio of 0 to 10%.

(2) Lateral Stretching

For laterally stretching the film, the film may be widened with clips beforehand attached onto both sides of the film. The stretching speed is preferably in the range of 5 to 300%/minute, more preferably in the range of 10 to 200%/minute, most preferably in the range of 15 to 150%/minute. The stretching temperature is preferably in the range of Tg (glass transition temperature of the film)–120° C. to Tg+50° C., more preferably in the range of Tg–110° C. to Tg+30° C. For heating the film, the film is preferably stretched in a thermostatic bath (tenter method). The film may be stretched either at one stretching temperature or at two or more temperatures. For stretching the film at two or more temperatures, the tenter is divided into two or more parts in which stretching temperatures are individually set.

For preventing the film from wrinkling, the film is preferably preheated before stretching and gradually cooled after stretching. The film may be preheated either stepwise or continuously. In the stepwise preheating, the film is heated and kept for 1 second to 3 minutes at one or more temperatures between room temperature and the stretching temperature, and then heated to the stretching temperature. In the continuous preheating, the film is continuously heated from room temperature to the stretching temperature at a rate of 10 to 1,000° C./minute. It is also preferred to combine these preheating methods. The heated film after stretched is gradually cooled from the stretching temperature to room temperature. The film may be cooled either stepwise or continuously. In the stepwise cooling, the film is cooled and kept for 1 second to 3 minutes at one or more temperatures between the stretching temperature and room temperature, and then cooled to room temperature. In the continuous cooling, the film is continuously cooled from the stretching temperature to room temperature at a rate of −10 to −1,000° C./minute. It is also preferred to combine these cooling methods. Further, to improve the film surface, the film is preferably subjected to additional stretching at an extension ratio of 0 to 10%. In contrast, it is also preferred to relax the film at a ratio of 0 to 10%.

(Dimension of Film)

The thickness of the film is preferably in the range of 20 to 500 μm, more preferably in the range of 20 to 300 μm, further preferably in the range of 30 to 200 μm, most preferably in the range of 35 to 150 μm. The width is preferably in the range of 0.4 to 4 m, more preferably in the range of 0.5 to 3 m, most preferably in the range of 0.6 to 2 m. Near each side edge of the film, a knurl is preferably provided. The knurled position is preferably in the area of 5 to 30 mm, preferably 7 to 20 mm from the edge. The height of the knurl is preferably 10 to 100 μm, more preferably 20 to 80 μm. For forming the knurl, the film is pressed either from one or both of the top and the bottom.

(Saponification Treatment)

An alkaline solution is applied on one surface of the cellulose ester film so that only the surface on which the orientation layer is to be provided may be selectively saponified. As the coating method, known methods such as dip-coating, curtain-coating, extrusion coating, bar-coating and E type coating can be adopted. If the dip coating is adopted, the opposite surface (which is not to be saponified) is masked before the film is dipped in the alkaline solution.

The solvent of the alkaline solution (coating solution for saponification) is preferably excellent in wettability with the cellulose ester film, and also preferably hardly swells out the film (namely, hardly makes the film surface rough). As the solvent, alcohols are preferred. Particularly, monohydric or dihydric alcohols having 1 to 5 carbon atoms are preferred. Examples of the alcohols include ethyl alcohol, normal-propyl alcohol, iso-propyl alcohol, normal-butyl alcohol, iso-butyl alcohol, tert-butyl alcohol and ethylene glycol. A particularly preferred alcohol is iso-propyl alcohol. Two or more alcohols may be mixed to use. The solvent may contain water in an amount of 0 to 50 wt. %, preferably 0 to 30 wt. %, and more preferably 0 to 15 wt. %. An aqueous solution of surface-active agent can be used as the solvent.

An alkali well-soluble in the above solvent is preferably used in the solution. As the alkali, KOH and NaOH are particularly preferred. The alkaline solution has a pH value of preferably 10 or more, more preferably 12 or more.

In order to saponify well, the surface is made to keep coated with the alkaline solution preferably for 1 second to 5 minutes, more preferably for 2 seconds to 1 minute, most preferably for 3 seconds to 30 seconds. The surface is then preferably washed with water, and dried. The temperature at which the film is saponified is preferably in the range of 10 to 80° C., more preferably in the range of 15 to 60° C., most preferably in the range of 20 to 40° C.

In the invention, the cellulose ester film is preferably saponified under a reduced oxygen gas atmosphere. The oxygen gas concentration in the atmosphere is in the range of 0 to 18%, preferably in the range of 0 to 15%, more preferably in the range of 0 to 10%. If the alkaline solution is applied under such atmosphere, the surface properties of the film can be controlled to enhance the adhesion to the orientation layer. The gas component other than oxygen gas in the atmosphere is preferably an inert gas. Examples of the inert gas include nitrogen, helium, and argon. Nitrogen is particularly preferred.

After saponifying the film, the alkaline solution is washed away with washing liquid. The temperature of the washing liquid is preferably in the range of 30 to 80° C., more preferably in the range of 35 to 70° C., most preferably in the range of 40 to 65° C. The cellulose ester film coated with the alkaline solution may be immersed in a washing liquid bath, or otherwise the washing liquid may be sprayed onto the film. The washing liquid may be water, and may contain other solvents in an amount of 0 to 50% (preferably 0 to 20%). Examples of the solvents include alcohols having 5 or less carbon atoms. Particularly preferably, the washing liquid is pure water. After washed, the film is dried at 40 to 200° C., preferably 50 to 150° C., more preferably 60 to 120° C.

Successively after the film surface is saponified, the orientation layer can be provided in the manner described after. According to the invention, only one surface of the cellulose ester film can be selectively saponified. Therefore, even if the film in which the orientation layer is provided on the saponified surface is wound up into a roll, the surface of the orientation layer by no means sticks onto the bottom surface (surface on which the orientation layer is not provided).

(Surface Properties of Cellulose Ester Film)

The saponification by applying the alkaline solution reduces "undesirable brilliant points" or "unevenness of displaying". However, the inventors have found that, for surely avoiding "undesirable brilliant points", it is necessary to control the surface properties of the saponified film surface. In other wards, even if the film surface is saponified, "undesirable brilliant points" cannot be fully reduced without controlling the surface properties. Further, it is also found that, if a liquid crystal display comprising the film having a saponified surface whose properties are not controlled is used for a long time, "fogs" are often observed in a displayed image.

The term "undesirable brilliant points" means defects sparking on a screen of liquid crystal display, and hence the defects are easily observed when a dark image is displayed. According to the inventors' study, the brilliant points are caused by dust attached on the orientation layer or on the optically anisotropic layer. It is also found that the dust is formed when the optical compensatory sheet is cut (or punched out) to size for the display. Because of shock in cutting or punching out the sheet, the orientation layer (together with the optically anisotropic layer) is slightly peeled from the film to form the dust.

The term "fogs" means foggy defects on the screen, and hence they are easily observed when a white image is displayed. The fogs hardly appear immediately after the display is produced, but often appear after the display is used for a long time. According to the inventors' study, a low-molecular weight compound (e.g., plasticizer) contained in the cellulose ester film (used as the optical compensatory sheet) is gradually deposited for a long time at the interface between the orientation layer and the optically anisotropic layer to cause the fogs. It is also found that the fogs are more liable to be caused in the case where the film is coated with the alkaline solution than in the case where the film is immersed in the alkaline solution bath for saponifying.

It is further found that, if the surface saponified by coating satisfies at least one (preferably, two or more) of the following conditions (1) to (5), not only the merits of the coating saponification are fully given (for example, the surface can be kept smooth) but also the undesirable brilliant points can be avoided without causing the fogs when the optical compensatory sheet is used in a liquid crystal display.

The surface conditions for preventing the cellulose ester film saponified by coating from "undesirable brilliant points" and "fogs" are as follows:

(1) the saponification depth at the surface is in the range of 0.010 to 0.8 μm (preferably in the range of 0.020 to 0.6 μm, more preferably in the range of 0.040 to 0.4 μm);

(2) at the surface, the ratio between numbers of chemical bonds C=O per C—O (C=O/C—O) is in the range of 0 to 0.6 (preferably in the range of 0 to 0.55, more preferably in the range of 0 to 0.5), while the ratio of C—C per C—O (C—C/C—O) is in the range of 0.45 to 0.75 (preferably in the range of 0.5 to 0.7, more preferably in the range of 0.5 to 0.65);

(3) if the cellulose ester film contains a phosphorus-containing compound as the plasticizer, the ratio between contents of elements O per C (O/C) at the surface is in the range of 0.62 to 0.75 (preferably in the range of 0.63 to 0.73, more preferably in the range of 0.64 to 0.71), while the ratio of P per C (P/C) is in the range of 0.007 to 0.015 (preferably in the range of 0.008 to 0.0145, more preferably in the range of 0.009 to 0.014);

(4) the contact angle with water is in the range of 20° to 55° (preferably in the range of 25° to 50°, more preferably in the range of 30° to 45°); and (5) if the cellulose ester film is made of cellulose acetate, the degree of acetyl substitution at the surface is in the range of 1.8 to 2.7 (preferably in the range of 1.85 to 2.5, more preferably in the range of 1.9 to 2.4).

It is not clearly known why the surface satisfying the above conditions is free from the undesirable brilliant points and fogs, but is assumed below.

If the saponification depth is too deep, the main chain of cellulose ester positioned near the surface is cut so that the molecular weight is lowered to impair the mechanical strength and accordingly to deteriorate the adhesion between the film and the orientation layer. Further, since the film surface is excess (and deeply) saponified, much amount of low-molecular weight compound (e.g., plasticizer) comes out and precipitates on the surface. The low-molecular weight compound further comes out for a long time onto the surface of the orientation layer, to cause fogs.

On the other hand, if the saponification depth is too shallow, the film is so insufficiently saponified that the adhesion between the film and the orientation layer is lowered. Further, since the saponification depth is extremely shallow, a little amount of low-molecular weight compound (e.g., plasticizer) positioned near the surface is liable to come out and precipitate for a long time on the surface of the orientation layer.

The condition of coating saponification is controlled so that the cellulose ester film may satisfy the above surface conditions. It is very important to coat the film with the alkaline solution under a low oxygen atmosphere of 18% or less and to wash the alkaline solution with a liquid (preferably, hot water) at a temperature of 30° C. to 80° C. The process for saponification is described after in detail together with the production process of optical compensatory sheet.

(Evaluation of Surface Properties)

The surface properties of cellulose ester film are described below.

(1) Saponification Depth at Film Surface

While the surface of the film is being subjected to ion etching, the amount of elements specific to the alkali used for the saponification is measured according to the photoelectron spectroscopy (XPS). From the obtained etching time, the saponification depth is calculated on the basis of the data of a standard sample.

(Preparation of Standard Sample)

To 10 weight parts of triacetyl cellulose, 5 weight parts of colloidal silica is added. The obtained mixture is dissolved in a mixed solvent of 90 weight parts of dichloromethane and 10 weight parts of methanol. The solution is applied on a cellulose ester film (e.g., a commercially available film, Fujitac) to form a layer having approx. 0.2 μm thickness (dry condition). After the layer is dried, the thickness is again measured by means of a thickness meter to determine the thickness (t) in terms of μm. Thus, a standard sample is prepared.

(Calculation of Saponification Depth)

The standard sample is etched by means of a photoelectron spectrometer (ESCA750, Shimadzu Seisakusho Ltd., acceleration voltage: 2 kV, acceleration current: 20 mA) under an argon gas atmosphere of $5 \times 10^{-4}$ Pa. While the etching is performed for 2 minutes, the signal of Si-2p is measured. The measurement is repeated, and the total etching time (T) elapsing until the intensity of the signal weakens to 1/10 of that of the first measurement is determined. From t/T (μm/minute), the etching rate is determined. Based on that, the saponification depth of the tested sample is calculated.

(Evaluation of Saponification Depth at Surface of Tested Sample)

The cellulose ester film is coated with an alkaline solution to saponify. Immediately after the alkaline solution remaining on the surface is wiped with filter paper, the film is frozen with liquid nitrogen and then freeze-dried to fix the alkali penetrated into the film. In the same manner as the standard sample, the thus-treated film is subjected to the XPS measurement while being etched to evaluate the saponification depth. The element to be detected in the XPS is that specific to the alkali. Namely, if NaOH or KOH is used for the saponification, the signal of Na or K is measured, respectively. While the etching is performed for 2 minutes, the signal is measured. The measurement is repeated, and the total etching time elapsing until the intensity of the signal weakens to 1/10 of that of the first measurement is determined. From t/T (μm/minute), the etching rate is determined. Based on the etching time, the saponification depth of the tested sample is calculated.

(2) Ratios of Chemical Bonds C=O/C—O and C—C/C—O Existing on Film Surface

After saponified, washed and dried, the cellulose ester film is subjected to the XPS measurement with the photoelectron spectrometer (ESCA750, Shimadzu Seisakusho Ltd.). Form the obtained spectrum, the ratios C=O/C—O and C—C/C—O are evaluated through the following steps.

i) A spectrum assigned to $C_{1s}$ is measured in the bonding energy range of 295 to 280 eV.

ii) In the spectrum, a line that connects the minimum point in the range of 295 to 293 eV and that in the range of 282 to 280 eV is drawn to determine the base line.

iii) The amount of C—O is estimated from the maximum intensity (based on the base line) in the spectrum of $C_{1s}$ since the bonding energy giving the maximum intensity corresponds to that of C—O.

The bonding energy higher than that of C—O by 2.1 eV corresponds to that of C=O, and hence the intensity at that bonding energy represents the amount of C=O.

The bonding energy lower than that of C—O by 1.4 eV corresponds to that of C—C, and hence the intensity at that bonding energy represents the amount of C—C.

From the thus-obtained intensities, the ratios of chemical bonds C=O/C—O and C—C/C—O existing on the film surface are evaluated.

(3) Ratios of Elements O/C and P/C Existing on Film Surface

After saponified, washed and dried, the cellulose ester film is subjected to the XPS measurement with the photoelectron spectrometer (ESCA750, Shimadzu Seisakusho Ltd.). Form the obtained spectra, the ratios O/C and P/C are evaluated through the following steps.

i) A spectrum assigned to $C_{1s}$ is measured in the bonding energy range of 295 to 280 eV. In the measured spectrum, a line that connects the minimum point in the range of 295 to 293 eV and that in the range of 282 to 280 eV is drawn to determine the base line, and the area bounded by the base line and the spectrum is measured to determine the value X (cps·eV).

ii) Another spectrum assigned to $O_{1s}$ is measured in the bonding energy range of 540 to 526 eV. In the measured spectrum, a line that connects the minimum point in the range of 540 to 538 eV and that in the range of 528 to 526 eV is drawn to determine the base line, and the area bounded by the base line and the spectrum is measured. The value of the measured area is then divided by the ionization cross section (2.85) to determine the value Y (cps·eV).

iii) Sill another spectrum assigned to $P_{2p}$ is measured in the bonding energy range of 145 to 125 eV. In the measured spectrum, a line that connects the average intensity in the range of 143 to 141 eV and that in the range of 129 to 127 eV is drawn to determine the base line, and the area bounded by the base line and the spectrum is measured. The value of the measure area is then divided by the ionization cross section (1.25) to determine the value Z (cps·eV).

iv) Finally, the ratios Y/X and Z/X are calculated to estimate those of elements O/C and P/C, respectively.

(4) Contact Angle with Water

After saponified, washed and dried, the cellulose ester film is left for 3 hours under the conditions of 25° C. (temperature) and 60% (humidity). The contact angle with water is then measured by means of a contact angle meter (CA-A, KYOWA INTERFACE SCIENCE CO., LTD.).

(5) Acetic Acid Content at Film Surface

According to the ATR-IR method, the acetic acid content at the film surface is measured through the following steps.

i) After saponified, washed and dried, the cellulose ester film is subjected to the ATR-IR measurement in which the incident angle is controlled at 45° by means of a Ge prism.

ii) In the obtained IR spectrum, a line that connects the minimum absorption point in the range of 1,450 to 1,550 $cm^{-1}$ and that in the range of 1,350 to 1,300 $cm^{-1}$ is drawn to determine the base line, and the absorption intensity (based on the base line) in the range of 1,360±20 $cm^{-1}$ is measured to determine the maximum absorption I. On the other hand, another line that connects the minimum absorption point in the range of 1,200 to 1,100 $cm^{-1}$ and that in the range of 900 to 800 $cm^{-1}$ is drawn to determine the base line, and the absorption intensity (based on the base line) in the range of 1,150±20 $cm^{-1}$ is measured to determine the maximum absorption i. The ratio of I/i is then calculated.

iii) Finally, assuming that the I/i ratios are 0.5 and 4.7 when the acetic acid contents are 0 and 3, respectively, the relation between the acetic acid content and the I/i is linearly approximated to estimate the acetic acid content at the film surface from the above-obtained I/i.

(Orientation Layer)

Examples of the orientation layer include a layer of an organic compound (preferably polymer) subjected to rubbing treatment, an obliquely deposited layer of an inorganic compound, and a layer having micro grooves. Further, a built-up film formed according to Langmuir-Blodgett technique (LB technique) from ω-tricosanoic acid, dioctadecyldimethylammoniumchloride or methyl stearate can be used as the orientation layer. In addition, a layer prepared by orienting dielectric materials by application of electric field or magnetic field can be employed as the orientation layer. The polymer layer subjected to the rubbing treatment is particularly preferred. The rubbing treatment is performed by rubbing the surface of the layer several times with paper or cloth along a certain direction.

The polymer for forming the orientation layer is selected according to the displaying mode of liquid crystal cell. For example, for a liquid crystal cell in which rod-like liquid crystal molecules are essentially vertically aligned (e.g., cell of VA, OCB or HAN mode), the polymer is selected so that the orientation layer may essentially horizontally align liquid crystal molecules in the optically anisotropic layer. In contrast, if most of the rod-like liquid crystal molecules in the cell are essentially horizontally aligned (e.g., cell of STN mode), the polymer is selected so that the orientation layer may essentially vertically align liquid crystal molecules in the optically anisotropic layer. For a cell in which most of the rod-like liquid crystal molecules are essentially obliquely aligned (e.g., cell of TN mode), the polymer is selected so that the orientation layer may essentially obliquely align liquid crystal molecules in the optically anisotropic layer.

Examples of the polymer are described in the aforementioned publications in which various optical compensatory sheets using discotic liquid crystal molecules are proposed according to liquid crystal cells of various display modes.

The polymer may be cross-linked to reinforce the orientation layer. For example, cross-linking groups are introduced and then made to react to cross-link the polymer. Japanese Patent Provisional Publication No. 8(1996)-338913 describes the cross-linking of the polymer for forming the orientation layer.

The thickness of the orientation layer is preferably in the range of 0.01 to 5 μm, more preferably in the range of 0.05 to 1 μm.

(Optically Anisotropic Layer)

The optically anisotropic layer is formed from liquid crystal molecules.

As the liquid crystal molecules, rod-like or discotic molecules are preferred. Discotic liquid crystal molecules are particularly preferred.

Examples of the rod-like liquid crystal compound include azomethines, azoxys, cyanobiphenyls, cyanophenyl esters, benzoic esters, cyclohexanecarboxylate phenyl esters, cyanophenylcyclohexanes, cyano-substituted phenylpyrimidines, alkoxy-substituted phenylpyrimidines, phenyldioxanes, tolanes, and alkenylcyclohexylbenzonitriles. Not only low-molecular weight liquid crystal compounds like the above but also polymer liquid crystal compounds can be used. The polymer liquid crystal compounds comprise side chains corresponding to the low-molecular weight liquid crystal compounds like the above. Japanese Patent Provisional Publication No. 5(1993)-53016 discloses an optical compensatory sheet using the polymer liquid crystal compound.

The discotic liquid crystal compounds are described in various publications (e.g., C. Destrade et al., Mol. Cryst. vol. 71, pp. 111, (1981); "Chemistry of Liquid crystal (Japanese)", Kagaku-Sosetsu, 22(1994), Chapters 5 and 10 (section 2); B. Kohn et al., Angew. Chem. Soc. Chem. Comm., pp. 1794, (1985); and J. Zhang et al., J. Am. Chem. Soc. vol. 116, pp.2655, (1994)). Japanese Patent Provisional Publication No. 8(1996)-27284 describes polymerization of discotic liquid crystals.

A polymerizable group should be bound to a discotic core of the discotic compound to cause the polymerization reaction and thereby to fix the discotic liquid crystal molecules. However, if the polymerizable group is directly bound to the discotic core, it is difficult to keep the alignment at the polymerization reaction. Therefore, a linking group is introduced between the discotic core and the polymerizable group. Accordingly, the discotic liquid crystal compound having a polymerizable group preferably is represented by the following formula (I).

$$D(\text{-L-P})_n \quad (I)$$

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

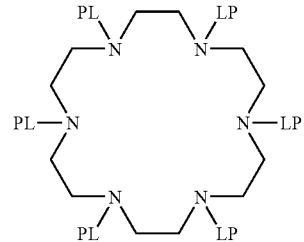
(D3)

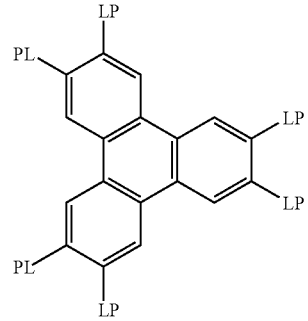
(D4)

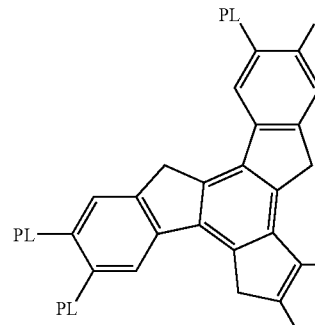
(D5)

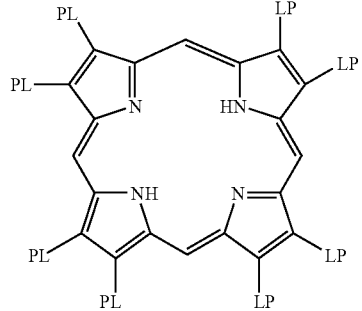
(D1)

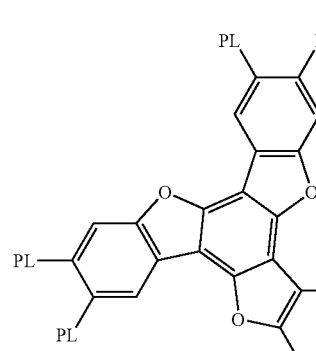
(D6)

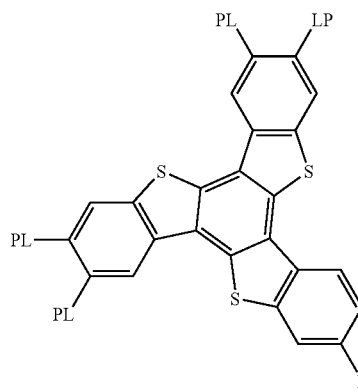
(D2)

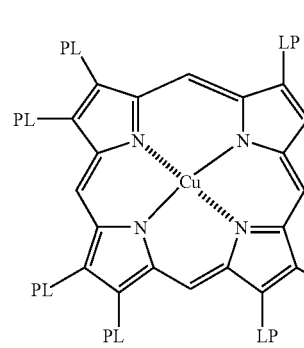
(D7)

-continued
(D8)
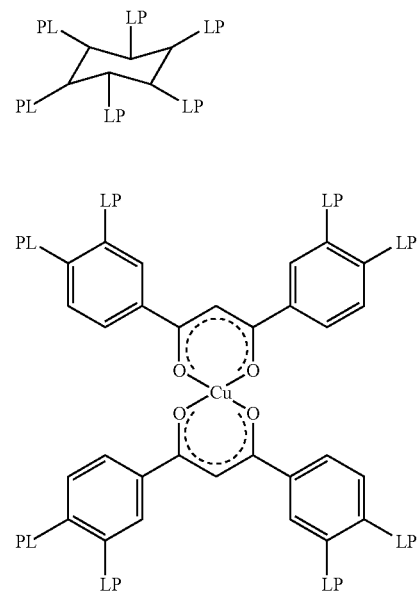
(D9)
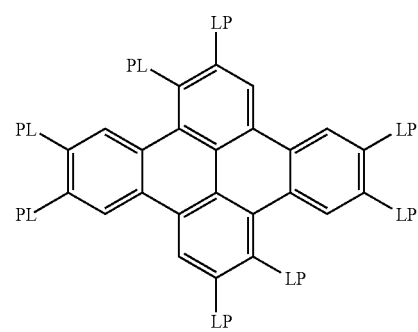
(D10)
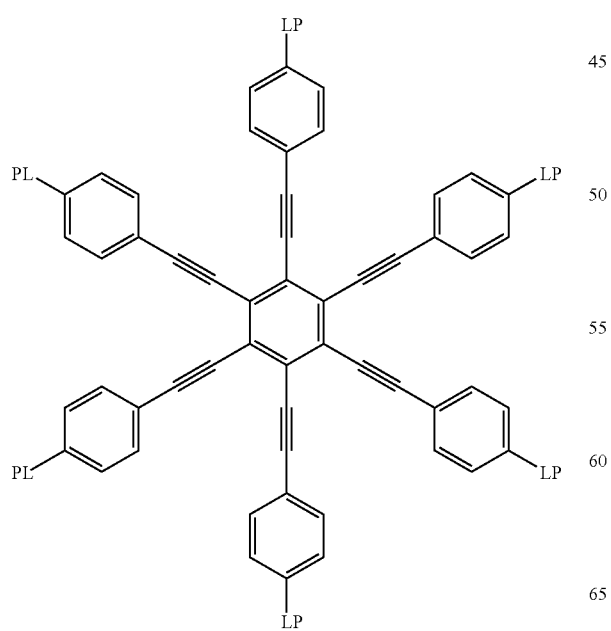
(D11)
-continued
(D12)
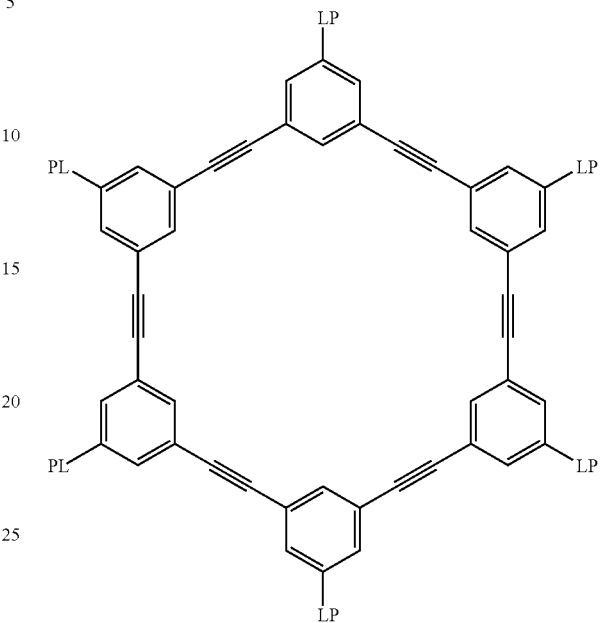
(D13)
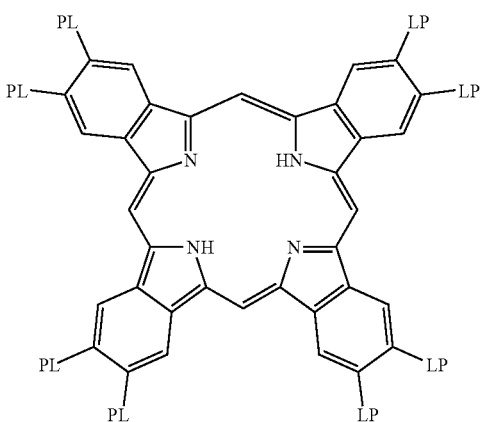
(D14)
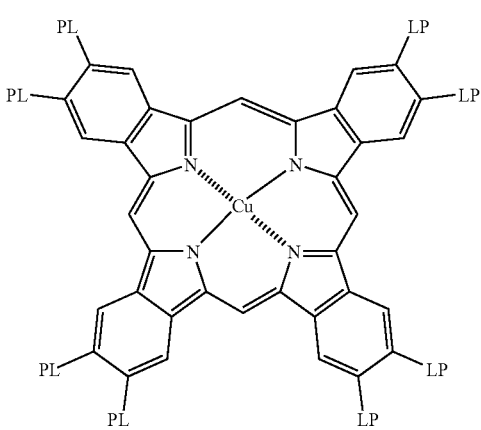

-continued

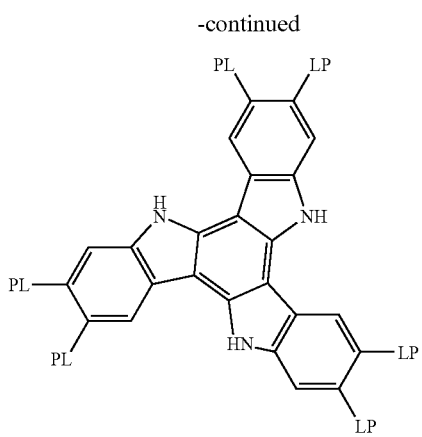

(D15)

In the formula (I), the divalent linking group (L) preferably is selected from the group consisting of an alkylene group, an alkenylene group, an arylene group, —CO—, —NH—, —O—, —S— and combinations thereof. The L more preferably is a divalent linking group comprising at least two divalent groups selected from the group consisting of an alkylene group, an alkenylene group, an arylene group, —CO—, —NH—, —O— and —S—. The L most preferably is a divalent linking group comprising at least two divalent groups selected from the group consisting of an alkylene group, an alkenylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group may have substituent groups (e.g., alkyl groups, halogen atoms, cyano, alkoxy groups, acyloxy groups).

Examples of the divalent linking groups (L) are shown below. In the examples, the left side is attached to the discotic core (D), and the right side is attached to the polymerizable group (P). The AL means an alkylene group or an alkenylene group. The AR means an arylene group.

L1: -AL-CO—O-AL-
L2: -AL-CO—O-AL-O—
L3: -AL-CO—O-AL-O-AL-
L4: -AL-CO—O-AL-O—CO—
L5: —CO-AR—O-AL-
L6: —CO-AR—O-AL-O—
L7: —CO-AR—O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AL-AR—O-AL-O—CO—
L17: —O—CO-AR—O-AL-CO—
L18: —O—CO-AR—O-AL-O—CO—
L19: —O—CO-AR—O-AL-O-AL-O—CO—
L20: —O—CO-AR—O-AL-O-AL-O-AL-O—CO—
L21: —S-AL-
L22: —S-AL-O—
L23: —S-AL-O—CO—
L24: —S-AL-S-AL-
L25: —S-AR-AL-

For compensating a cell in which rod-like liquid crystal molecules are oriented in twisted alignment (e.g., cell of STN mode), the discotic liquid crystal molecules are preferably also oriented in twisted alignment. If the above AL (alkylene or alkenylene group) has an asymmetric carbon, the discotic liquid crystal molecules can be spirally oriented in twisted alignment. Otherwise, it can also orient the discotic molecules spirally in twisted alignment to incorporate an optical active compound having an asymmetric carbon (namely, a chiral agent) into the optically anisotropic layer.

The polymerizable group (P) in the formula (I) is determined according to the polymerization reaction. Examples of the polymerizable groups (P) are shown below.

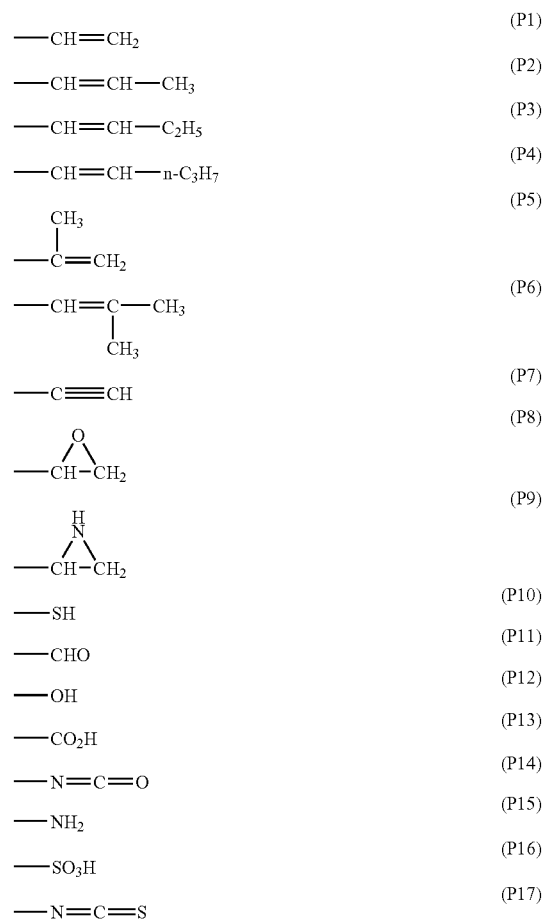

The polymerizable group (P) preferably is an unsaturated polymerizable group (P1 to P7), an epoxy group (P8) or an aziridyl group (P9), more preferably is an unsaturated polymerizable group, and most preferably is an ethylenically unsaturated group (P1 to P6).

In the formula (I), n is an integer of 4 to 12, which is determined according to the chemical structure of the discotic core (D). The 4 to 12 combinations of L and P can be different from each other. However, the combinations are preferably identical.

Two or more discotic liquid crystal compounds may be used in combination. For example, the aforementioned polymerizable discotic liquid crystal compound and non-polymerizable one can be used in combination.

The non-polymerizable discotic liquid crystal compound is preferably a compound in which the polymerizable group in the aforementioned polymerizable liquid crystal compound is replaced with a hydrogen atom or an alkyl group. In other wards, the non-polymerizable discotic liquid crystal compound is preferably represented by the following formula (II).

in which D is a discotic core; L is a divalent linking group; R is a hydrogen atom or an alkyl group; and n is an integer of 4 to 12.

Examples of the discotic cores (D) in the formula (II) are the same as those shown above except that the LP (or PL) is replaced with LR (or RL). Examples of the divalent linking groups (L) in the formula (II) are also the same as those shown above.

The alkyl group of R has preferably 1 to 40, more preferably 1 to 30 carbon atoms. A chain alkyl group is preferred to a cyclic one, and a straight chain alkyl group is particularly preferred. The R is particularly preferably a hydrogen atom or a straight chain alkyl group having 1 to 30 carbon atoms.

For providing the optically anisotropic layer, a coating solution containing the liquid crystal molecules, the following polymerization initiator and optional additives (e.g., plasticizer, monomer, surface active agent, cellulose ester, 1,3,5-triazine compound, chiral agent) is applied on the orientation layer.

As the solvent for preparing the coating solution, organic solvents are preferred. Examples of the organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone), and ethers (e.g., tetrahydrofuran, 1,2-dimethoxyethane). Alkyl halides and ketones are preferred. Two or more organic solvents are preferably used in combination.

The coating solution is applied according to the known method (e.g., extrusion-coating, direct gravure coating, reverse gravure coating, dip-coating).

The liquid crystal molecules are preferably essentially homogeneously aligned. More preferably, the molecules are fixed with the homogeneous alignment maintained. Most preferably, the homogeneously aligned molecules are polymerized to fix.

The polymerization reaction can be classified into a thermal reaction with a thermal polymerization initiator and a photo-reaction with a photo polymerization initiator. The photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with ultraviolet rays.

The exposure energy is preferably in the range of 20 to 50,000 mJ/cm$^2$, more preferably in the range of 100 to 800 mJ/cm$^2$. The light irradiation can be conducted while the layer is heated to accelerate the photo polymerization reaction.

The thickness of the optically anisotropic layer is preferably in the range of 0.1 to 10 μm, more preferably in the range of 0.5 to 5 μm, most preferably in the range of 1 to 5 μm. However, for some modes of liquid crystal cells, thick optically anisotropic layers (thickness: 3 to 10 μm) may be provided.

As described above, how the liquid crystal molecules are aligned in the optically anisotropic layer is determined according to the displaying mode of liquid crystal cell. The alignment of liquid crystal molecules is controlled by what kind of liquid crystal compound is used, what kind of orientation layer is provided, and what additives (e.g., plasticizer, binder, surface active agent) are incorporated.

(Surface Treatment of Optical Compensatory Sheet)

In the case where the optical compensatory sheet is unified with a polarizing membrane to produce a polarizing plate, the membrane-facing surface of the sheet may be subjected to a surface treatment to enhance the adhesion between the sheet and the membrane. Examples of the surface treatment include corona discharge treatment, glow discharge treatment, flame treatment, acid treatment, alkali treatment, and ultraviolet (UV) treatment.

In the corona or glow discharge treatment, the surface of the optical compensatory sheet is exposed to discharge. The discharge treatment can be carried out by means of a commercially available discharge treatment apparatus.

The discharge treatment is preferably performed in the presence of aqueous vapor. The partial pressure of aqueous vapor is preferably in the range of 10 to 100%, more preferably in the range of 40 to 90%, based on the total pressure. Prior to the discharge treatment, the cellulose ester film is preferably preheated. The temperature of preheating is preferably 50° C. or more, more preferably 70° C. or more, most preferably 80° C. or more. The upper limit of the temperature is the glass transition point of the cellulose ester film.

The glow discharge treatment is carried out under a degree of vacuum preferably in the range of 0.005 to 20 Torr, more preferably in the range of 0.02 to 2 Torr. The voltage for performing the glow discharge treatment is preferably in the range of 500 to 5,000 V, more preferably in the range of 500 to 3,000 V. The frequency of the glow discharge is preferably in the range of 50 Hz to 20 MHz, more preferably in the range of 1 KHz to 1 MHz. The intensity of the glow discharge is preferably in the range of 0.01 to 5 KV·A·minute/m$^2$, more preferably in the range of 0.15 to 1 KV·A·minute/m$^2$.

Immediately after the discharge treatment is completed, the optical compensatory sheet is preferably cooled.

In performing the flame treatment, it is important to control the mixing ratio between gas (natural gas, propane gas) and air. The volume ratio of gas/air is preferably in the range of 1/13 to 1/21, more preferably in the range of 1/14 to 1/20. The heat quantity applied to the cellulose ester film is preferably in the range of 1 to 50 kcal/m$^2$. The film is preferably positioned so that the gap between the film and the top of inner flame may be 4 cm or less.

For performing the acid or alkali treatment, the optical compensatory sheet is immersed in an acidic or alkaline aqueous solution, respectively.

Acid for the acid treatment is preferably an inorganic acid such as hydrochloric acid, sulfuric acid or nitric acid. Alkali for the alkali treatment is preferably a hydroxide of alkali metal such as sodium hydroxide or potassium hydroxide. The immersing time is preferably in the range of 30 seconds to 10 minutes. After immersed in the solution, the film is washed with water.

Particularly preferably, the acid or alkali treatment is performed through a coating procedure in the same manner as that subjected to the orientation layer-facing surface of the cellulose ester film.

In the ultraviolet (UV) treatment, the polarizing membrane-facing surface of the optical compensatory sheet is exposed to ultraviolet rays.

The wavelength of the ultraviolet rays is preferably in the range of 220 to 380 nm. The exposure energy is preferably in the range of 20 to 10,000 mJ/cm$^2$, more preferably in the range of 50 to 2,000 mJ/cm$^2$, and most preferably in the range of 100 to 1,500 mJ/cm$^2$.

(Transparent Protective Film)

As the transparent protective film of the polarizing plate, a polymer film is used. The term "transparent" means that the polymer film has a light-transmittance of 80% or more. The transparent protective film is normally made of cellulose ester, preferably acetyl cellulose. The cellulose ester film is preferably formed according to the solvent cast method. The thickness of the protective film is preferably in the range of 20 to 500 µm, more preferably in the range of 50 to 200 µm.

For improving the adhesion to the polarizing membrane, the protective film is preferably subjected to one or more of the aforementioned various surface treatments. In performing the saponification treatment, the treatment is preferably carried out by coating.

(Polarizing Plate)

The polarizing plate comprises a pair of transparent protective films and a polarizing membrane provided between them. The polarizing membrane is, for example, a stretched film of hydrophilic polymer (e.g., partially saponified copolymer of ethylene-vinyl acetate, partially formalized polyvinyl alcohol, polyvinyl alcohol) adsorbing iodine or dichromatic dye. Otherwise, a plastic film (e.g., a polyvinyl chloride film) treated to align the polyene is also usable as the polarizing membrane.

If the optical compensatory sheet of the invention is used as one of the transparent protective films in the polarizing plate, an excellent (elliptically) polarizing plate can be produced. The optical compensatory sheet is preferably placed so that the slow axis of the sheet may be oriented in average at an angle of 3° or less to the transmission axis of the polarizing membrane. The angle is more preferably 2° or less, most preferably 1° or less.

In the case where the polarizing membrane and the optical compensatory sheet comprising liquid crystal molecules are laminated to prepare an elliptically polarizing plate, the compensatory sheet can serve as one of the transparent protective films. The thus-prepared elliptically polarizing plate has a layered structure in which a transparent protective film, the polarizing membrane, a transparent support, and an optically anisotropic layer comprising liquid crystal molecules are layered in this order. The support and the anisotropic layer constitute the optical compensatory sheet. Since a liquid crystal display is generally wanted to be as both thin and light-weight as possible, it is preferred to reduce the number of members constituting the display. Form this viewpoint, the above polarizing plate in which one member plays two roles (namely, the compensatory sheet not only optically compensates the displayed image but also functions as a protective film) is preferably used in a liquid crystal display. In addition, the liquid crystal display consisting of reduced members can be produced through reduced steps for laminating. Accordingly, troubles in the production steps can be reduced. Japanese Patent Provisional Publication Nos. 7(1995)-191217, 8(1996)-21996 and 8(1996)-94838 describe the unified elliptically polarizing plate in which one film functions not only as one of the protective films protecting the polarizing membrane but also as the support of the optical compensatory sheet comprising liquid crystal molecules.

A TFT liquid crystal display of TN mode is often equipped with the aforementioned unified elliptically polarizing plate, in which the transparent support of the optical compensatory sheet comprising liquid crystal molecules serves as one of the protective films of the polarizing plate. That liquid crystal display thermally deforms, and is liable to give an image with leaked light. The thermal deformation changes optical characters of the optical compensatory sheet, and consequently causes the light-leakage. Particularly, a film of polymer having hydroxyl groups (such as a cellulose ester film) is largely affected by the environmental conditions. For reducing the light-leakage caused by the thermal deformation, the inventors have found that it is effective to lower the photoelasticity of the optical compensatory sheet and particularly to thin down the cellulose ester film.

However, the inventors have also found that it is difficult to handle the thin cellulose ester film when the gelatin-undercoating layer is provided through a coating procedure.

If the optical compensatory sheet is produced according to the process of the invention, it is not necessary to provide the gelatin-undercoating layer. Accordingly, the process of the invention is also effective in producing the thin optical compensatory sheet having excellent planeness.

(Circularly Polarizing Plate)

A circularly polarizing plate can be produced if the optical compensatory sheet is used as a λ/4 plate. In that case, the optical compensatory sheet is laminated on the polarizing membrane so that the slow axis in the plane of the sheet may be oriented essentially at the angle of 45° to the polarizing axis of the membrane. The term "essentially at the angle of 45°" means the angle is in the range of 40° to 50°. The angle is preferably in the range of 41° to 49°, more preferably in the range of 42° to 48°.

(Liquid Crystal Display)

The optical compensatory sheet of the invention or the polarizing plate comprising the sheet of the invention is advantageously used in a liquid crystal display, especially in a liquid crystal display of transmission type.

A liquid crystal display of transmission type comprises a pair of polarizing plates and a liquid crystal cell placed between them. The liquid crystal cell comprises a pair of electrode substrates and liquid crystal molecules provided between them.

The optical compensatory sheet of the invention is placed between the cell and one or each of the polarizing plates.

The polarizing plate of the invention is used as one or each of the pair of polarizing plates. In that case, the plate of the invention is placed so that the compensatory sheet of the plate may face to the liquid crystal cell.

The optical compensatory sheet or the polarizing plate according to the invention is particularly advantageously used in a liquid crystal display having a liquid crystal cell of TN mode, VA mode and OCB mode.

In a liquid crystal cell of TN mode, rod-like liquid crystal molecules are essentially horizontally aligned while voltage is not applied, and oriented in a twisted alignment with a twisted angle of 60 to 120°. The liquid crystal cell of TN mode is widely used in color TFT liquid crystal displays, and hence is described in many publications.

In a liquid crystal cell of VA mode, rod-like liquid crystal molecules are essentially vertically aligned while voltage is not applied.

The liquid crystal cell of VA mode include some types: (1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied; (2) a liquid crystal cell of MVA mode (described in SID97, Digest of tech. Papers, 28(1997), 845), in which the VA mode is modified to be multi-domain type so as to enlarge the viewing angle; (3) a liquid crystal cell of n-ASM mode (described in Abstracts of Japanese Forum of Liquid Crystal (written in Japanese), (1998), pp. 58 to 59), in which rod-like liquid crystal molecules are essentially vertically aligned while voltage is not applied, and the molecules are essentially oriented in twisted multi-domain alignment while voltage is applied; and (4) a cell of SUR-VAIVAL mode (presented in LCD International '98).

The liquid crystal cell of OCB mode is a liquid crystal cell of bend alignment mode in which rod-like liquid crystal molecules in upper part and ones in lower part are essentially reversely (symmetrically) aligned. A liquid crystal display having the liquid crystal cell of bend alignment mode is disclosed in U.S. Pat. Nos. 4,583,825 and 5,410,422. Since rod-like liquid crystal molecules in upper part and ones in lower part are symmetrically aligned, the liquid crystal cell of bend alignment mode has self-optical compensatory function. Therefore, this mode is referred to as OCB (optically compensatory bend) mode. The liquid crystal display of bend alignment mode has an advantage of responding rapidly since rod-like liquid crystal molecules in upper part and ones in lower part are symmetrically aligned.

(Liquid Crystal Display of Reflection Type)

The optical compensatory sheet of the invention is also advantageously used in a liquid crystal display of reflection type. In that case, the compensatory sheet is preferably used as a $\lambda/4$ plate in a liquid crystal display explained below as an example. The circularly polarizing plate according to the invention may be used as a $\lambda/4$ plate or a polarizing membrane.

The liquid crystal display of reflection type comprises a lower substrate, a reflective electrode, a lower orientation layer, a liquid crystal layer, an upper orientation layer, a transparent electrode, an upper substrate, a $\lambda/4$ plate, and a polarizing membrane, layered in this order.

A combination of the lower substrate and the reflective electrode constitutes a reflection board. A combination of the lower orientation layer to the upper orientation layer constitutes a liquid crystal cell. The $\lambda/4$ plate may be placed at any position between the reflection board and the polarizing membrane.

For displaying a color image, a color filter layer is additionally provided. The color filter is preferably placed between the reflective electrode and the lower orientation layer, or between the upper orientation layer and the transparent electrode.

In place of the reflective electrode, another transparent electrode may be used in combination with a reflection board. The reflection board is preferably a metal board. If the reflection board has a smooth surface, rays parallel to the normal of the surface are often predominantly reflected to give a small viewing angle. Therefore, the surface of the reflection board is preferably made rugged (as described in Japanese Patent No. 275,620). Otherwise, a light-diffusing film may be provided on one surface (cell side or air side) of the polarizing membrane.

The liquid crystal cell is preferably TN (twisted nematic) mode, STN (supper twisted nematic) mode, or HAN (hybrid aligned nematic) mode.

The liquid crystal cell of TN mode has a twist angle preferably in the range of 40 to 100°, more preferably in the range of 50 to 90°, most preferably in the range of 60 to 80°. The product ($\Delta n \cdot d$) of refractive anisotropy ($\Delta n$) and thickness (d) of the liquid crystal layer is preferably in the range of 0.1 to 0.5 µm, more preferably in the range of 0.2 to 0.4 µm.

The liquid crystal cell of STN mode has a twist angle preferably in the range of 180 to 360°, more preferably in the range of 220 to 270°. The product ($\Delta n \cdot d$) of refractive anisotropy ($\Delta n$) and thickness (d) of the liquid crystal layer is preferably in the range of 0.3 to 1.2 µm, more preferably in the range of 0.5 to 1.0 µm.

In the liquid crystal cell of HAN mode, it is preferred that liquid crystal molecules be essentially vertically aligned on one substrate and that the pre-tilt angle on the other substrate be in the range of 0 to 45°. The product ($\Delta n \cdot d$) of refractive anisotropy ($\Delta n$) and thickness (d) of the liquid crystal layer is preferably in the range of 0.1 to 1.0 µm, more preferably in the range of 0.3 to 0.8 µm. The substrate on which the liquid crystal molecules are vertically aligned may be on the transparent electrode side or on the reflection board side.

The liquid crystal display of reflection type may be a display of guest-host type.

The guest-host display of reflection type comprises a lower substrate, an organic membrane insulating the layers, a metal reflection board, a $\lambda/4$ plate, a lower transparent electrode, a lower orientation layer, a liquid crystal layer, an upper orientation layer, an upper transparent electrode, a light-diffusing film, an upper substrate, and an anti-reflection film, layered in this order. A TFT is provided between the lower substrate and the organic membrane insulating the layers.

In place of providing the light-diffusing film, the surface of the reflection board may be made rugged to give the light-diffusing function to the board. The anti-reflection film preferably has an anti-glare function as well as the anti-reflection function.

EXAMPLE 1

(Preparation of Cellulose Ester Film)

The following components were placed in a mixing tank, and then heated and stirred to dissolve. Thus, a cellulose acetate solution was prepared.

| Components of cellulose acetate solution | |
|---|---|
| Cellulose acetate (acetic acid content: 60.9%) | 100 weight parts |
| Triphenyl phosphate | 7.8 weight parts |
| Biphenyldiphenyl phosphate | 3.9 weight parts |
| Methylene chloride | 300 weight parts |
| Methanol | 54 weight parts |
| 1-Butanol | 11 weight parts |

In another mixing tank, the following components were placed, heated and stirred to dissolve. Thus, a retardation-increasing agent solution was prepared.

| Components of retardation-increasing agent solution | |
|---|---|
| 2-Hydroxy-4-benzyloxybenzophenone | 12 weight parts |
| 2,4-Benzyloxybenzophenone | 4 weight parts |
| Methylene chloride | 80 weight parts |
| Methanol | 20 weight parts |

The prepared retardation-increasing agent solution in the amount of 22 weight parts was added to 474 weight parts of the cellulose acetate solution, and stirred well to mix. The thus-prepared dope contained 3 weight parts of the retardation-increasing agent based on 100 weight parts of cellulose acetate.

The dope was cast from a nozzle onto a drum cooled at 0° C. The formed film was peeled when the solvent content reached 70 wt. %, and both sides of the film was fixed with a pin tenter. While the film was set up so that the stretching ratio might be kept 3% in the lateral direction (perpendicular to the machine), the film was dried until the solvent content reached 3 to 5 wt. %. The film was then transferred and further dried in a heating apparatus equipped with many rollers. The stretching ratio along the machine was essentially 0% at a temperature higher than 120° C., which is the glass transition temperature. In order to stretch the film along the machine by 4% when the film was peeled, the stretching ratio in the direction perpendicular to the machine was 0.75 times as much as the total stretching ratio along the machine. Thus, a cellulose acetate film having 107 μm thickness (CA-1) was produced.

The retardation of the produced film was measured to find that the Rth and Re were 80 nm and 11 nm, respectively (Saponification Treatment and Formation of Orientation Layer)

The cellulose acetate film (CA-1) was coated with 1.5 N KOH-isopropyl alcohol solution in the amount of 25 ml/m², and dried at 25° C. for 5 seconds. The coated surface of the film was then washed with flowing water for 10 seconds, and blown with air at 25° C. to dry.

On the thus-treated surface, the following coating solution was then applied in the amount of 28 ml/m² by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was parallel to the longitudinal direction of the film CA-1.

| Coating solution for orientation layer | |
|---|---|
| The following denatured polyvinyl alcohol | 20 weight parts |
| Water | 360 weight parts |
| Methanol | 120 weight parts |
| Glutaric aldehyde (cross-linking agent) | 0.5 weight part |

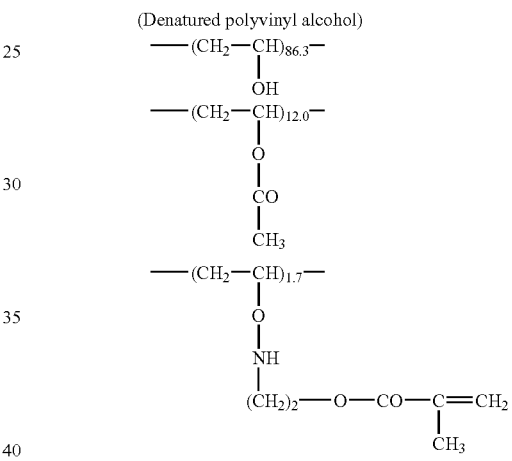

(Denatured polyvinyl alcohol)

(Formation of Optically Anisotropic Layer)

The following discotic liquid crystal coating solution was applied by means of a wire bar coater of #4, and heated in a thermostat at 125° C. for 3 minutes to align the discotic liquid crystal molecules. The thus-treated surface was then irradiated with ultraviolet rays emitted from a high-pressure mercury lamp at the exposure energy of 500 mJ/cm², and then cooled to room temperature. Thus, an optical compensatory sheet KS-1 was produced.

| Discotic liquid crystal coating solution | |
|---|---|
| The following discotic liquid crystal DLC-A | 9.1 weight parts |
| Ethylene oxide denatured trimethylol propane triacrylate (V#360, Osaka Organic Chemicals Col, Ltd.) | 0.9 weight part |
| Cellulose acetate butyrate (CAB-531-0.2, Eastman Chemical) | 0.2 weight part |
| Cellulose acetate butyrate (CAB-531-1, Eastman Chemical) | 0.05 weight part |
| Photopolymerization initiator (Irgacure 907, Ciba-Geigy) | 3.0 weight parts |
| Sensitizer (Kayacure DETX, Nippon Kayaku Co., Ltd.) | 0.1 weight part |
| Methyl ethyl ketone | 25.9 weight parts |

-continued

Discotic liquid crystal coating solution (Discotic liquid crystal DLC-A)

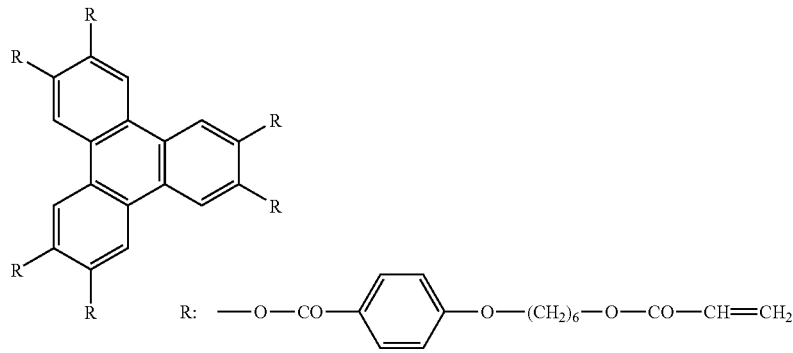

R: —O—CO—⟨C6H4⟩—O—(CH$_2$)$_6$—O—CO—CH=CH$_2$

The formed optically anisotropic layer had the thickness of 1.8 μm. The retardation of the optical compensatory sheet KS-1 was measured along the rubbing direction of the orientation layer, and thereby it was found that the average inclined angle of the optical axis was 18.0° and that the retardation values Rth and Re were 160 nm and 33 nm, respectively. Further, the optical compensatory sheet KS-1 was sandwiched between a pair of polarizing plates in cross-Nicol arrangement, and it was observed whether striped unevenness occurred or not. The results are set forth in Table 1.

The optically anisotropic layer-side surface of the compensatory sheet KS-1 was laminated on a glass plate with an acrylic adhesive, and left at 90° C. for 20 hours. The acrylic adhesive was the same as that used for assembling the liquid crystal display in the following examples, and the glass plate was the same as that used in the liquid crystal cell in the following examples. The compensatory sheet was then vertically peeled from the glass plate, and the bared surface of the plate was observed to evaluate how much amount of the optically anisotropic layer of the compensatory sheet remained and thereby to estimate the adhesion. On the basis of the observation, the adhesion was classified into five grades of 0 (much amount of the anisotropic layer remained) to 5 (the anisotropic layer did not remained at all). The results are set forth in Table 1.

EXAMPLE 2

(Preparation of Cellulose Ester Film)

A three-layered casting die was used. The dope for inner layer was the cellulose acetate dope prepared in Example 1, and that for outer layers was a diluted dope prepared in the same manner as that in Example 1 except that the amount of the solvent was increased by 10%. The dopes were simultaneously cast onto a metal support. The formed film was peeled off, and dried to prepare a three-layered cellulose acetate film (thickness of inner layer: thickness of each outer layer=8:1). The film was stepwise dried at 70° C. for 3 minutes and at 130° C. for 5 minutes, and then peeled from the support. The peeled film was then further dried at 160° C. for 30 minutes to evaporate the solvent. Thus, a cellulose acetate film (CA-2) was prepared.

The retardation of the produced film was measured to find that the Rth and Re were 80 nm and 11 nm, respectively (Saponification Treatment and Formation of Orientation Layer)

The cellulose acetate film (CA-2) was saponified and an orientation layer was provided in the same manner as in Example 1. The orientation layer was subjected to the rubbing treatment in which the rubbing direction was parallel to the longitudinal direction of the film CA-2.

(Formation of Optically Anisotropic Layer)

An optically anisotropic layer was formed on the orientation layer of the cellulose acetate film CA-2 in the same manner as in Example 1, to produce an optical compensatory sheet KS-2.

The formed optically anisotropic layer had the thickness of 1.8 μm. The retardation of the optical compensatory sheet KS-2 was measured along the rubbing direction of the orientation layer, and thereby it was found that the average inclined angle of the optical axis was 18.0° and that the retardation values Rth and Re were 160 nm and 33 nm, respectively. Further, the optical compensatory sheet KS-2 was sandwiched between a pair of polarizing plates in cross-Nicol arrangement, and it was observed whether striped unevenness occurred or not. The adhesion was also evaluated in the same manner as in Example 1. The results are set forth in Table 1.

EXAMPLE 3

(Preparation of Cellulose Ester Film)

The cellulose triacetate solution consisting of the following components were prepared. The solvents shown below were beforehand mixed, and then cellulose triacetate powder (mean particle size: 2 mm) was gradually added to the mixed solvent while stirred. The mixture was left at room temperature (25° C.) for 3 hours.

| Components of cellulose acetate solution | |
|---|---|
| Cellulose acetate (acetic acid content: 60.9%) | 100 weight parts |
| Triphenyl phosphate | 7.8 weight parts |
| Biphenyldiphenyl phosphate | 3.9 weight parts |
| 2-Hydroxy-4-benzyloxybenzophenone | 2.25 weight parts |
| 2,4-Benzyloxybenzophenone | 0.75 weight part |
| Methyl acetate | 282 weight parts |

-continued

| Components of cellulose acetate solution | |
|---|---|
| Cyclopentanone | 118 weight parts |
| Methanol | 29 weight parts |
| Ethanol | 29 weight parts |

The prepared dope was cast on a drum cooled at 0° C. The formed film was peeled when the solvent content reached 70 wt. %, and both sides of the film was fixed with a pin tenter. While held so that the stretching ratio might be kept 3% in the lateral direction (perpendicular to the machine), the film was dried until the solvent content reached 3 to 5 wt. %. The film was then transferred and further dried in a heating apparatus equipped with many rollers. The stretching ratio along the machine was essentially 0% at a temperature higher than 120° C., which is the glass transition temperature. In order to stretch the film along the machine by 4% when the film was peeled, the stretching ratio in the direction perpendicular to the machine was 0.75 times as much as the total stretching ratio along the machine. Thus, a cellulose acetate film having 107 μm thickness (CA-3) was produced.

The retardation of the produced film was measured to find that the Rth and Re were 80 nm and 11 nm, respectively (Saponification Treatment and Formation of Orientation Layer)

The cellulose acetate film (CA-3) was saponified and an orientation layer was provided in the same manner as in Example 1. The orientation layer was subjected to the rubbing treatment in which the rubbing direction was parallel to the longitudinal direction of the film CA-3.

(Formation of Optically Anisotropic Layer)

An optically anisotropic layer was formed on the orientation layer of the cellulose acetate film CA-3 in the same manner as in Example 1, to produce an optical compensatory sheet KS-3.

The formed optically anisotropic layer had the thickness of 1.8 μm. The retardation of the optical compensatory sheet KS-3 was measured along the rubbing direction of the orientation layer, and thereby it was found that the average inclined angle of the optical axis was 18.0° and that the retardation values Rth and Re were 160 nm and 33 nm, respectively. Further, the optical compensatory sheet KS-3 was sandwiched between a pair of polarizing plates in cross-Nicol arrangement, and it was observed whether striped unevenness occurred or not. The adhesion was also evaluated in the same manner as in Example 1. The results are set forth in Table 1.

COMPARISON EXAMPLE 1

(Preparation of Cellulose Ester Film)

On the cellulose acetate film CA-1 prepared in Example 1, the following coating solution for gelatin-undercoating layer was applied in the amount of 28 ml/m². The applied solution was then dried to form a gelatin-undercoating layer. Thus, a cellulose acetate film CA-4 was prepared.

| Coating solution for gelatin-undercoating layer | |
|---|---|
| Gelatin | 5.42 weight parts |
| Formaldehyde | 1.39 weight parts |
| Salicylic acid | 1.6 weight parts |
| Acetone | 391 weight parts |
| Methanol | 158 weight parts |
| Methylene chloride | 406 weight parts |
| Water | 12 weight parts |

(Formation of Orientation Layer)

On the cellulose acetate film (CA-4), the coating solution for orientation layer used in Example 1 was applied in the amount of 28 ml/m² by means of a wire bar coater of #16. The applied solution was dried with hot air at 60° C. for 60 seconds, and then further dried with hot air at 90° C. for 150 seconds.

The formed layer was subjected to the rubbing treatment in which the rubbing direction was parallel to the longitudinal direction of the film CA-4.

(Formation of Optically Anisotropic Layer)

An optically anisotropic layer was formed on the orientation layer of the cellulose acetate film CA-4 in the same manner as in Example 1, to produce an optical compensatory sheet KS-4.

The formed optically anisotropic layer had the thickness of 1.8 μm. The retardation of the optical compensatory sheet KS-4 was measured along the rubbing direction of the orientation layer, and thereby it was found that the average inclined angle of the optical axis was 18.0° and that the retardation values Rth and Re were 160 nm and 33 nm, respectively. Further, the optical compensatory sheet KS-4 was sandwiched between a pair of polarizing plates in cross-Nicol arrangement, and it was observed whether striped unevenness occurred or not. The adhesion was also evaluated in the same manner as in Example 1. The results are set forth in Table 1.

TABLE 1

| | Film | Striped unevenness* | Adhesion |
|---|---|---|---|
| Example 1 | KS-1 | B | 5 |
| Example 2 | KS-2 | A | 5 |
| Example 3 | KS-3 | B | 5 |
| Comp. Ex. 1 | KS-4 | C | 5 |

(Remarks)
*Grades of striped unevenness:
A: not observed (if ten persons observed, none of them can notice the unevenness),

EXAMPLE 4

(Preparation of Polarizing Plate)

The optical compensatory sheet KS-1 prepared in Example 1 was immersed in 1.5 N NaOH aqueous solution (55° C.) for 2 minutes, neutralized with 0.5 N sulfuric acid, washed with flowing water, and dried.

On the cellulose acetate film (CA-1)-side surface of the compensatory sheet KS-1, a polarizing membrane (stretched polyvinyl alcohol film adsorbing iodine) was laminated with a polyvinyl alcohol adhesive.

On the opposite surface of the compensatory sheet KS-1, a saponified commercially available cellulose acetate film (Fujitac TD80UF, Fuji Photo Film Co., Ltd.) was laminated with the polyvinyl alcohol adhesive. The polarizing membrane was placed so that the transmission axis of the membrane might be perpendicular to the slow axis of the compensatory sheet KS-1. Thus, a polarizing plate P-1 was prepared.

EXAMPLE 5

(Preparation of Polarizing Plate)

The procedure of Example 4 was repeated except that the optical compensatory sheet KS-2 prepared in Example 2 was used, to prepare a polarizing plate P-2.

EXAMPLE 6

(Preparation of Polarizing Plate)

The procedure of Example 4 was repeated except that the optical compensatory sheet KS-3 prepared in Example 3 was used, to prepare a polarizing plate P-3.

COMPARISON EXAMPLE 2

(Preparation of Polarizing Plate)

The procedure of Example 4 was repeated except that the optical compensatory sheet KS-4 prepared in Comparison Example 1 was used, to prepare a polarizing plate P-4.

EXAMPLE 7

A pair of polarizing plates was removed from a commercially available liquid crystal display (6E-A3, Sharp Corporation), which had a liquid crystal cell of TN mode. In place of the removed members, the polarizing plate P-1 prepared in Example 4 was laminated on each side (each of the backlight side and the observer side) of the cell with an adhesive so that the optical compensatory sheet KS-1 might be on the liquid crystal cell side. The polarizing plates were arranged so that the transmission axis of the plate on the observer side might be perpendicular to that of the plate on the backlight side.

The viewing angle of the prepared liquid crystal display was measured by means of a measuring apparatus (EZ-Contrast 160D, ELDIM) when each of eight tones of black (L1) to white (L8) was displayed. The viewing angle was represented by the angle range giving a contrast ratio of 10 or more without reversing black tones. Further, it was confirmed by the eyes whether unevenness of displaying was observed or not when a dark image was displayed. The results are set forth in Table 2.

EXAMPLE 8

The procedure of Example 7 was repeated except that the polarizing plate (P-2) prepared in Example 5 was used, to prepare a liquid crystal display.

The viewing angle of the prepared display was measured in the same manner as in Example 7. Further, it was confirmed by the eyes whether unevenness of displaying was observed or not when a dark image was displayed. The results are set forth in Table 2.

EXAMPLE 9

The procedure of Example 7 was repeated except that the polarizing plate P-3 prepared in Example 6 was used, to prepare a liquid crystal display.

The viewing angle of the prepared display was measured in the same manner as in Example 7. Further, it was confirmed by the eyes whether unevenness of displaying was observed or not when a dark image was displayed. The results are set forth in Table 2.

COMPARISON EXAMPLE 3

The procedure of Example 7 was repeated except that the polarizing plate P-4 prepared in Comparison Example 2 was used, to prepare a liquid crystal display.

The viewing angle of the prepared display was measured in the same manner as in Example 7. Further, it was confirmed by the eyes whether unevenness of displaying was observed or not when a dark image was displayed. The results are set forth in Table 2.

TABLE 2

| Liquid crystal display | Viewing angle | | | Unevenness* |
|---|---|---|---|---|
| | Upward | Downward | Left-rightward | |
| Example 7 | 65° | 35° | 140° | B |
| Example 8 | 65° | 35° | 140° | A |
| Example 9 | 65° | 35° | 140° | B |
| Comp. Ex. 3 | 65° | 35° | 140° | C |

(Remarks)

*Grades of unevenness:

A: not observed (if ten persons observed, none of them can notice the unevenness), B: slightly observed (if ten persons observed, one to five of them can notice the unevenness), and C: considerably observed (if ten persons observed, six or more of them can notice the unevenness).

EXAMPLE 10

(Preparation of Optical Compensatory Sheet)

The following components were placed in a mixing tank, and then heated and stirred to dissolve. Thus, a cellulose acetate solution was prepared.

| Components of cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 336 weight parts |
| Methanol (second solvent) | 29 weight parts |

In another mixing tank, 16 weight parts of the following retardation-increasing agent, 80 weight parts of methylene chloride and 20 weight parts of methanol were placed, heated and stirred to dissolve. Thus, a retardation-increasing agent solution was prepared.

Retardation-increasing agent

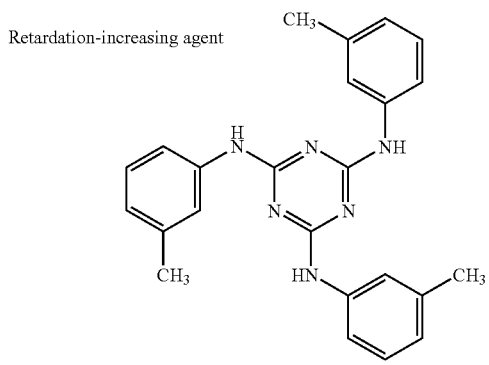

The prepared cellulose acetate solution and the retardation-increasing agent solution were mixed in amounts of 474 weight parts and 21 weight parts, respectively, and stirred well to prepare a dope. The content of the retardation-increasing agent in the dope was 2.8 weight parts based on 100 weight parts of cellulose acetate.

The prepared dope was cast onto a film-forming band. When the remaining solvent reached 50 wt. %, the formed film was peeled from the band and dried. When the remaining solvent reached 40 wt. %, the film was laterally stretched at 130° C. in the extension ratio of 20% by means of a tenter. The film was held at 130° C. for 30 seconds with the stretched width maintained, and then released from the clips. Thus, a cellulose acetate film CA-5 (thickness: 95 μm) was prepared.

The retardation of the produced film was measured to find that the Rth and Re were 110 nm and 20 nm, respectively (Saponification Treatment and Formation of Orientation Layer)

The cellulose acetate film (CA-5) was coated with 1.5 N KOH-isopropyl alcohol solution in the amount of 25 ml/m², and dried at 25° C. for 5 seconds. The coated surface of the film was then washed with flowing water for 10 seconds, and blown with air at 25° C. to dry.

On the thus-treated surface, the following coating solution was then applied in the amount of 21 ml/m² by means of a wire bar coater of #12. The applied solution was dried with hot air at 120° C. for 120 seconds.

The formed layer was subjected to the rubbing treatment in which the rubbing direction was parallel to the longitudinal direction of the film CA-5.

| Coating solution for orientation layer | |
|---|---|
| The following polymer material | 4 weight parts |
| Water | 280 weight parts |
| Methanol | 120 weight parts |
| Triethyl amine | 5.6 weight parts |

(Polymer material)

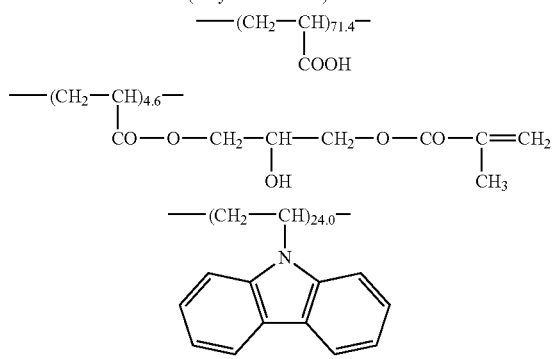

(Formation of Optically Anisotropic Layer)

The following discotic liquid crystal coating solution was applied on the formed orientation layer by means of a wire bar coater of #3, and heated in a thermostat at 90° C. for 2 minutes to align the discotic liquid crystal molecules. The thus-treated surface was then irradiated with ultraviolet rays emitted from a high-pressure mercury lamp at the exposure energy of 250 mJ/cm², and then cooled to room temperature. Thus, an optical compensatory sheet KS-5 was produced.

| Discotic liquid crystal coating solution | |
|---|---|
| The following liquid crystal LC-A | 80.0 weight parts |
| The following horizontally aligning agent | 0.24 weight part |
| Cellulose acetate butyrate (CAB-531-0.2, Eastman Chemical) | 0.16 weight part |
| Photopolymerization initiator (Irgacure 907, Ciba-Geigy) | 2.4 weight parts |
| Sensitizer (Kayacure DETX, Nippon Kayaku Co., Ltd.) | 0.8 weight part |
| Methyl ethyl ketone | 1095.8 weight parts |

(Liquid crystal LC-A)

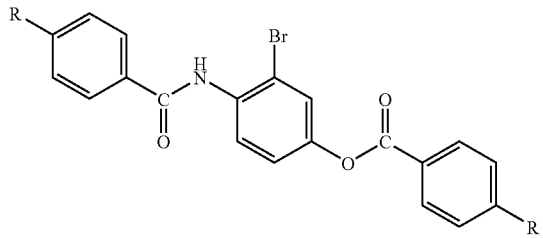

R: —O—(CH$_2$)$_4$—O—CO—CH=CH$_2$ (Horizontally aligning agent)

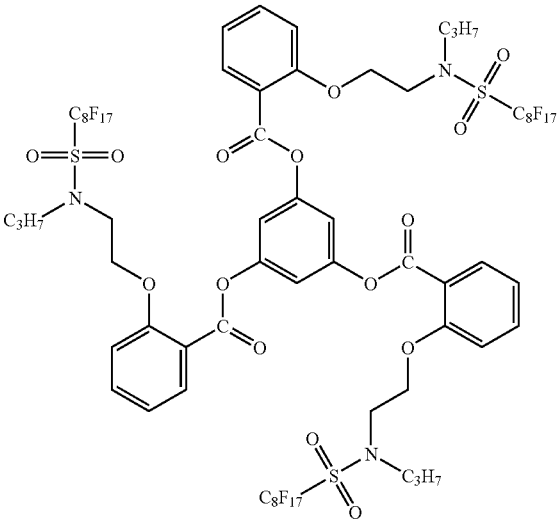

The formed optically anisotropic layer had the thickness of 0.4 μm. The retardation of the optical compensatory sheet KS-5 was measured along the rubbing direction of the orientation layer, and thereby it was found that the retardation value Re was 45 nm and that the rod-like liquid crystal molecules were horizontally aligned. Further, the optical compensatory sheet KS-5 was sandwiched between a pair of polarizing plates in cross-Nicol arrangement, and it was observed whether striped unevenness occurred or not. The adhesion was also evaluated in the same manner as in Example 1. The results are set forth in Table 3.

COMPARISON EXAMPLE 4

(Preparation of Cellulose Ester Film)

On the cellulose acetate film CA-5 prepared in Example 10, a gelatin-undercoating layer was formed in the same manner as in Comparison Example 1 to prepare a cellulose acetate film CA-6.

(Saponification Treatment and Formation of Orientation layer)

On the gelatin-undercoating layer of the cellulose acetate film CA-6, an orientation layer was formed in the same manner as in Example 10. The formed orientation layer was then subjected to the rubbing treatment in which the rubbing direction was parallel to the longitudinal direction of the film CA-6.

(Formation of Optically Anisotropic Layer)

An optically anisotropic layer was formed on the orientation layer of the cellulose acetate film CA-6 in the same manner as in Example 10, to produce an optical compensatory sheet KS-6.

The formed optically anisotropic layer had the thickness of 0.4 μm. The retardation of the optical compensatory sheet KS-6 was measured along the rubbing direction of the orientation layer, and thereby it was found that the retardation value Re was 45 nm and that the rod-like liquid crystal molecules were horizontally aligned. Further, the optical compensatory sheet KS-6 was sandwiched between a pair of polarizing plates in cross-Nicol arrangement, and it was observed whether striped unevenness occurred or not. The adhesion was also evaluated in the same manner as in Example 1. The results are set forth in Table 3.

EXAMPLE 11

(Formation of Optically Anisotropic Layer)

The orientation layer formed on the saponified surface of the cellulose acetate film (CA-1) prepared in Example 1 was subjected to the rubbing treatment in which the rubbing direction was at 45° to the slow axis of the film.

The discotic liquid crystal coating solution used in Example 1 was applied on the formed orientation layer by means of a wire bar coater of #3, and heated in a thermostat at 125° C. for 3 minutes to align the discotic liquid crystal molecules. The thus-treated surface was then irradiated with ultraviolet rays emitted from a high-pressure mercury lamp at the exposure energy of 500 mJ/cm$^2$, and then cooled to room temperature. Thus, an optical compensatory sheet KS-7 was produced.

The formed optically anisotropic layer had the thickness of 1.8 μm. The retardation of the optical compensatory sheet KS-7 was measured along the rubbing direction of the orientation layer, and thereby it was found that the average inclined angle of the optical axis was 18.0° and that the retardation values Rth and Re were 160 nm and 38 nm, respectively. Further, the optical compensatory sheet KS-7 was sandwiched between a pair of polarizing plates in cross-Nicol arrangement, and it was observed whether striped unevenness occurred or not. The adhesion was also evaluated in the same manner as in Example 1. The results are set forth in Table 3.

COMPARISON EXAMPLE 5

(Formation of Optically Anisotropic Layer)

The orientation layer formed on the gelatin-undercoating layer of the cellulose acetate film (CA-4) prepared in Comparison Example 1 was subjected to the rubbing treatment in which the rubbing direction was at 45° to the slow axis of the film.

The optically anisotropic layer was formed in the same manner as in Example 11 to produce an optical compensatory sheet KS-8.

The formed optically anisotropic layer had the thickness of 0.4 μm. The retardation of the optical compensatory sheet KS-8 was measured along the rubbing direction of the orientation layer, and thereby it was found that the retardation value Re was 45 nm and that the rod-like liquid crystal molecules were horizontally aligned. Further, the optical compensatory sheet KS-8 was sandwiched between a pair of polarizing plates in cross-Nicol arrangement, and it was observed whether striped unevenness occurred or not. The adhesion was also evaluated in the same manner as in Example 1. The results are set forth in Table 3.

TABLE 3

|  | Film | Striped unevenness* | Adhesion |
|---|---|---|---|
| Example 10 | KS-5 | B | 5 |
| Comp. Example 4 | KS-6 | C | 5 |
| Example 11 | KS-7 | B | 5 |
| Comp. Example 5 | KS-8 | C | 5 |

(Remarks)
*Grades of striped unevenness:
B: slightly observed (if ten persons observed, one to five of them can notice the unevenness), and
C: considerably observed (if ten persons observed, six or more of them can notice the unevenness).

EXAMPLE 12

(Preparation of Polarizing Plate)

The optical compensatory sheets KS-5 and KS-7 prepared in Examples 10 and 11, respectively, were immersed in 1.5 N NaOH aqueous solution (55° C.) for 2 minutes, neutralized with 0.5 N sulfuric acid, washed with flowing water, and dried.

On the cellulose acetate film (CA-5)-side surface of the compensatory sheet KS-5, a polarizing membrane (stretched polyvinyl alcohol film adsorbing iodine) was laminated with a polyvinyl alcohol adhesive. Further, the optically anisotropic layer-side surface of the sheet KS-5 and the cellulose acetate film (CA-1)-side surface of the compensatory sheet KS-7 were laminated with a polyvinyl alcohol adhesive.

On the opposite surface of the polarizing membrane, a saponified commercially available cellulose acetate film (Fujitac TD80UF, Fuji Photo Film Co., Ltd.) was laminated with the polyvinyl alcohol adhesive. The polarizing membrane was placed so that the transmission axis of the membrane might be parallel to the slow axis of the compensatory sheet KS-5 and might be at 45° to the slow axis of the compensatory sheet KS-7. Thus, a polarizing plate P-5 was prepared.

COMPARISON EXAMPLE 6

(Preparation of Polarizing Plate)

The procedure of Example 12 was repeated except that the optical compensatory sheets KS-6 and KS-8 prepared in Comparison Examples 4 and 5, respectively, were used, to prepare a polarizing plate P-6.

EXAMPLE 13

On a glass plate having an ITO electrode, an orientation layer of polyimide was provided and subjected to a rubbing treatment. This procedure was repeated to prepare two substrates, and the substrates were arranged face-to-face so that the rubbing directions might be parallel and that the gap might be 6 μm. Between them, a liquid crystal having Δn of 0.1396 (ZLI1132, Merck & Co., Inc.) was introduced to prepare a liquid crystal cell of bend alignment.

The polarizing plate P-5 prepared in Example 12 was laminated on each surface of the liquid crystal cell, so that the cell was between the plates. The plates were arranged so that the optically anisotropic layer in each plate might face to the cell substrate and that the rubbing directions of the cell and the optically anisotropic layer might be anti-parallel.

The viewing angle of the prepared liquid crystal display was measured by means of a measuring apparatus (EZ-Contrast 160D, ELDIM) when each of eight tones of black (L1) to white (L8) was displayed. The viewing angle was represented by the angle range giving a contrast ratio of 10 or more without reversing black tones. Further, it was confirmed by the eyes whether unevenness of displaying was observed or not when a dark image was displayed. The results are set forth in Table 4.

COMPARISON EXAMPLE 7

The procedure of Example 13 was repeated except that the polarizing plate P-6 prepared in Comparison Example 6 was used, to prepare a liquid crystal display.

The viewing angle of the prepared display was measured in the same manner as in Example 13. Further, it was confirmed by the eyes whether unevenness of displaying was observed or not when a dark image was displayed. The results are set forth in Table 4.

TABLE 4

| Liquid crystal display | Viewing angle | | |
|---|---|---|---|
| | Up-downward | Left-rightward | Unevenness* |
| Example 13 | 160° | 160° | B |
| Comp. Example 7 | 160° | 160° | C |

(Remarks)
*Grades of unevenness:
B: slightly observed (if ten persons observed, one to five of them can notice the unevenness), and
C: considerably observed (if ten persons observed, six or more of them can notice the unevenness).

EXAMPLE 14

(Preparation of Cellulose Ester Film)
The following components were placed in a mixing tank, and then heated and stirred to dissolve. Thus, a cellulose acetate solution was prepared.

| Components of cellulose acetate solution | |
|---|---|
| Cellulose acetate (acetic acid content: 60.9%) | 100 weight parts |
| Triphenyl phosphate | 7.8 weight parts |
| Biphenyldiphenyl phosphate | 3.9 weight parts |

-continued

| Components of cellulose acetate solution | |
|---|---|
| Methylene chloride | 300 weight parts |
| Methanol | 54 weight parts |
| 1-Butanol | 11 weight parts |

In another mixing tank, the following components were placed, heated and stirred to dissolve. Thus, a retardation-increasing agent solution was prepared.

| Components of retardation-increasing agent solution | |
|---|---|
| The retardation-increasing agent used in Example 10 | 16 weight parts |
| Methylene chloride | 80 weight parts |
| Methanol | 20 weight parts |

The prepared retardation-increasing agent solution in the amount of 21 weight parts was added to 479 weight parts of the cellulose acetate solution, and stirred well to mix. The thus-prepared dope contained 3 weight parts of the retardation-increasing agent based on 100 weight parts of cellulose acetate.

The prepared dope was cast onto a film-forming band. The formed dope film had been dried on the band for 1 minute since the temperature of the film reached 40° C. After peeled from the band, the film was further dried to prepare a cellulose acetate film CA-9 (thickness: 40 μm), in which the solvent remained in the amount of 0.3 wt. %.

The retardation of the produced film CA-9 was measured to find that the Rth and Re were 40 nm and 7 nm, respectively.

(Saponification Treatment and Formation of Orientation Layer)

The cellulose acetate film (CA-9) was saponified and an orientation layer was provided in the same manner as in Example 1. The orientation layer was subjected to the rubbing treatment in which the rubbing direction was parallel to the longitudinal direction of the film CA-9.

(Formation of Optically Anisotropic Layer)

A solution in which the following liquid-crystalline polyester (EPE01) was dissolved in tetrachloroethane in the amount of 8 wt. % was prepared. The solution was applied on the orientation layer of the cellulose acetate film CA-9 according to the spin-coating method. After the solvent was removed, the film was heated at 190° C. for 20 minutes and then cooled with air to fix the alignment of the liquid-crystalline polyester. Thus, an optical compensatory sheet KS-9 was produced.

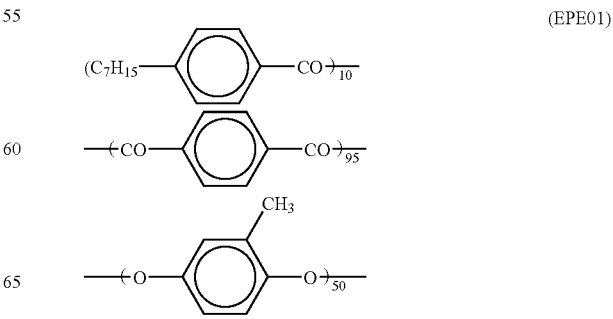

-continued

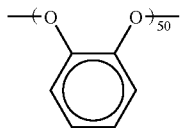

(The subscript attached to each repeating unit represents the molar ratio of each unit.)

The formed optically anisotropic layer had the thickness of 1.55 μm. The retardation of the optical compensatory sheet KS-9 was measured along the rubbing direction of the orientation layer, and thereby it was found that the average inclined angle of the optical axis was 42° and that the retardation value Re was 43 nm.

Further, the optical compensatory sheet KS-9 was sandwiched between a pair of polarizing plates in cross-Nicol arrangement, and it was observed whether striped unevenness occurred or not. The adhesion was also evaluated in the same manner as in Example 1. The results are set forth in Table 5.

COMPARISON EXAMPLE 8

(Preparation of Cellulose Ester Film)

On the cellulose acetate film CA-9 prepared in Example 13, a gelatin-undercoating layer was formed in the same manner as in Comparison Example 1 to prepare a cellulose acetate film CA-10.

(Formation of Orientation Layer)

On the gelatin-undercoating layer of the cellulose acetate film CA-10, an orientation layer was formed in the same manner as in Example 1. The formed orientation layer was then subjected to the rubbing treatment in which the rubbing direction was parallel to the longitudinal direction of the film CA-10.

(Formation of Optically Anisotropic Layer)

An optically anisotropic layer was formed on the orientation layer of the cellulose acetate film CA-10 in the same manner as in Example 14, to produce an optical compensatory sheet KS-10.

The formed optically anisotropic layer had the thickness of 1.55 μm. The retardation of the optical compensatory sheet KS-10 was measured along the rubbing direction of the orientation layer, and thereby it was found that the average inclined angle of the optical axis was 42° and that the retardation value Re was 43 nm.

Further, the optical compensatory sheet KS-10 was sandwiched between a pair of polarizing plates in cross-Nicol arrangement, and it was observed whether striped unevenness occurred or not. The adhesion was also evaluated in the same manner as in Example 1. The results are set forth in Table 5.

TABLE 5

|  | Film | Striped unevenness* | Adhesion |
| --- | --- | --- | --- |
| Example 14 | KS-9 | B | 5 |
| Comp. Example 8 | KS-10 | C | 5 |

(Remarks)
*Grades of striped unevenness:
B: slightly observed (if ten persons observed, one to five of them can notice the unevenness), and
C: considerably observed (if ten persons observed, six or more of them can notice the unevenness).

EXAMPLE 15

(Preparation of Polarizing Plate)

The procedure of Example 4 was repeated except that the optical compensatory sheet KS-9 prepared in Example 14 was used, to prepare a polarizing plate P-7.

COMPARISON EXAMPLE 9

(Preparation of Polarizing Plate)

The procedure of Example 4 was repeated except that the optical compensatory sheet KS-10 prepared in Comparison Example 8 was used, to prepare a polarizing plate P-8.

EXAMPLE 16

The procedure of Example 7 was repeated except that the polarizing plate P-7 prepared in Example 15 was used, to prepare a liquid crystal display.

The viewing angle of the prepared display was measured in the same manner as in Example 7. Further, it was confirmed by the eyes whether unevenness of displaying was observed or not when a dark image was displayed. The results are set forth in Table 6.

COMPARISON EXAMPLE 10

The procedure of Example 7 was repeated except that the polarizing plate P-8 prepared in Comparison Example 9 was used, to prepare a liquid crystal display.

The viewing angle of the prepared display was measured in the same manner as in Example 7. Further, it was confirmed by the eyes whether unevenness of displaying was observed or not when a dark image was displayed. The results are set forth in Table 6.

TABLE 6

| Liquid crystal display | Viewing angle | | | Unevenness* |
| --- | --- | --- | --- | --- |
|  | Upward | Downward | Left-rightward |  |
| Example 16 | 45° | 60° | 140° | B |
| Comp. Ex. 10 | 45° | 60° | 140° | C |

(Remarks)
*Grades of unevenness:
B: slightly observed (if ten persons observed, one to five of them can notice the unevenness), and
C: considerably observed (if ten persons observed, six or more of them can notice the unevenness).

EXAMPLE 17

(Preparation of Cellulose Ester Film-1)

From the dope prepared in Example 1, a cellulose acetate film was prepared according to each of the following processes (a) and (b).

(a) Single-Layered Film Formation (Preparation of Cellulose Acetate Film CA-11)

The dope was cast from a nozzle onto a drum cooled at 0° C. The formed film was peeled when the solvent content reached 70 wt. %, and both sides of the film was fixed ith a pin tenter. While held so that the stretching ratio might be kept 3% in the lateral direction (perpendicular to the machine), the film was dried until the solvent content reached 3 to 5 wt. %. The film was then transferred and further dried in a heating apparatus equipped with many rollers. The stretching ratio along the machine was essentially 0% at a temperature higher than 120° C., which is the glass transition temperature. In order to stretch the film along the machine by 4% when the film was peeled, the stretching ratio in the direction perpendicular to the machine was 0.75 times as much as the total stretching ratio along the machine. Thus, a cellulose acetate film having 107 μm thickness (CA-11) was produced.

(b) Multi-Layered Film Formation (Preparation of Cellulose Acetate Film CA-12)

A three-layered casting die was used. The dope for inner layer was the cellulose acetate dope prepared in Example 1, and that for outer layers was a diluted dope prepared in the same manner as that in Example 1 except that the amount of the solvent was increased by 10%. The dopes were simultaneously cast from the die onto a metal support. The formed film was treated in the same manner as in the above film-formation (a), to prepare a cellulose acetate film having 107 μm thickness (CA-12).

From each prepared film, both side areas inner by 15 cm from the edges were trimmed. Further, knurls (height: 50 μm, width: 1 cm) were provided near the edges. Thus, a cellulose acetate film (width: 1.5 m, length: 3,000 m) was prepared. The wastes of the film produced in the trimming were pulverized and mixed with virgin cellulose acetate to reuse. (The content of the reused cellulose acetate was 30 wt. % based on the total amount of cellulose acetate.)

(Preparation of Cellulose Ester Film-2: CA-13)

The dope prepared in Example 3 was cast from a nozzle onto a drum cooled at 0° C. The formed film was peeled when the solvent content reached 70 wt. %, and both sides of the film was fixed with a pin tenter. While held so that the stretching ratio might be kept 3% in the lateral direction (perpendicular to the machine), the film was dried until the solvent content reached 3 to 5 wt. %. The film was then transferred and further dried in a heating apparatus equipped with many rollers. The stretching ratio along the machine was essentially 0% at a temperature higher than 120° C., which is the glass transition temperature. In order to stretch the film along the machine by 4% when the film was peeled, the stretching ratio in the direction perpendicular to the machine was 0.75 times as much as the total stretching ratio along the machine. Thus, a cellulose acetate film having 107 μm thickness (CA-13) was produced.

(Saponification Treatment)

One surface of each prepared film (CA-11 to CA-13) was coated with 1.5 N KOH aqueous solution (alkaline solution) in the amount of 25 ml/m², and held at 25° C. for 5 seconds to saponify. The alkaline solution was then washed away with flowing water for 10 seconds, and the washed surface was blown with air at 25° C. to dry. The conditions of the saponification treatment such as oxygen gas concentration in the atmosphere, solvent components of the KOH solution, and temperature of the flowing water (washing water) are set forth in Table 7. Thus, cellulose acetate films used for the below-described optical compensatory sheets 17-1 to 17-9 were prepared. The surface properties of each cellulose acetate film were measured, and the results are set forth in Table 7.

(Formation of Orientation Layer)

On the saponified surface of each prepared cellulose acetate film, an orientation layer was provided in the same manner as in Example 1.

(Formation of Optically Anisotropic Layer)

An optically anisotropic layer was formed on the orientation layer of each cellulose acetate film in the same manner as in Example 1, to produce optical compensatory sheets 17-1 to 17-9.

Each formed optically anisotropic layer had the thickness of 1.8 μm. The retardation of each optical compensatory sheet (17-1 to 17-9) was measured along the rubbing direction of the orientation layer, and thereby it was found that the average inclined angles of the optical axes in the sheets were in the range of 17° to 19° and that the retardation values Rth and Re of the sheets were in the ranges of 150 to 170 nm and 31 to 35 nm, respectively.

On the optically anisotropic layer of each compensatory sheet, a checked pattern (consisting of five lateral lines and five vertical lines drawn at intervals of 5 mm) was carved with a razor. The depth of the notches was controlled not to cut the sheet but to reach the surface of the cellulose acetate film. Each optical compensatory sheet was then laminated on a glass plate with an acrylic adhesive so that the optically anisotropic layer-side surface of each sheet might be in contact with the glass plate. The acrylic adhesive was the same as that used for assembling the liquid crystal display in the following examples, and the glass plate was also the same as that used in the liquid crystal cell in the following examples. Each thus-prepared sample was left at 90° C. for 20 hours. The compensatory sheet of each sample was then vertically peeled from the glass plate, and the bared surface of the plate was observed to evaluate how much amount of the optically anisotropic layer of each compensatory sheet remained and thereby to estimate the adhesion. Since the surface of the compensatory sheet was curved, this adhesion test is severer than that in Example 1 and hence the endurance in sizing can be more suitably estimated. The test was carried out under each condition of 25° C. (temperature), 10% RH (humidity) and 25° C. (temperature), 60% RH (humidity). Although the sheet is practically sized under the latter condition, the test under the former condition was performed to estimate the endurance of the sheet under a severer condition. The adhesion was evaluated in terms of the percent ratio (%) of peeled area. The results are set forth in Table 7.

(Preparation of Polarizing Plate)

All the optical compensatory sheets were immersed in 1.5 N NaOH aqueous solution (55° C.) for 2 minutes, neutralized with 0.5 N sulfuric acid, washed with flowing water, and dried.

On the cellulose acetate film-side surface of each compensatory sheet, a polarizing membrane (stretched polyvinyl alcohol film adsorbing iodine) was laminated with a polyvinyl alcohol adhesive. The polarizing membrane was placed so that the transmission axis of the membrane might be perpendicular to the slow axis of the compensatory sheet.

On the opposite surface of each compensatory sheet, a saponified commercially available cellulose acetate film (Fujitac TD80UF, Fuji Photo Film Co., Ltd.) was laminated with the polyvinyl alcohol adhesive. Thus, a polarizing plate comprising each optical compensatory sheet was produced.

(Preparation of Liquid Crystal Display)

A pair of polarizing plates was removed from a commercially available liquid crystal display (6E-A3, Sharp Corporation), which had a liquid crystal cell of TN mode. In place of the removed members, each prepared polarizing plate was laminated on each side (each of the backlight side and the observer side) of the cell with an adhesive so that the optical compensatory sheet might be on the liquid crystal cell side.

The polarizing plates were arranged (in O mode) so that the transmission axis of the plate on the observer side might be perpendicular to that of the plate on the backlight side.

The viewing angle of the prepared liquid crystal display was measured by means of a measuring apparatus (EZ-Contrast 160D, ELDIM) when each of eight tones of black (L1) to white (L8) was displayed. The viewing angle was represented by the angle range giving a contrast ratio of 10 or more without reversing black tones. Further, it was confirmed by the eyes how much undesirable brilliant points were observed when a dark image was displayed. Before the displays were prepared, each compensatory sheet was sized under each condition of 25° C. (temperature), 10% RH (humidity) and 25° C. (temperature), 60% RH (humidity). Although practically sized under the latter condition, the sheet was also sized under the former condition to estimate troubles under a severer condition.

Also before the displays were prepared, all the prepared polarizing plates were left at 80° C. for 30 days (test for shelf life in long term). Independently, they were also left under a moderate condition, namely at 50° C. for 30 days. With each polarizing plate, the liquid crystal display was prepared. While each prepared display was giving a white image, it was observed by the eyes to confirm how much the displayed image was fogged. The fogs were evaluated in terms of the percent ratio (%) of fogged area based on the whole area of the displayed image. The results are set forth in Table 7.

TABLE 7

|  | Transparent support | Extension ratio | Saponification condition | | |
|---|---|---|---|---|---|
|  |  |  | Solvent (wt. %) | Oxygen concentration | Temperature of washing water |
| 17-1 | CA-11 | 1 | IPA (100) | 3% | 60° |
| 17-2 | CA-11 | 1 | IPA (100) | 0% | 40° |
| 17-3 | CA-12 | 1 | IPA (100) | 6% | 50° |
| 17-4 | CA-12 | 1 | IPA (100) | 18% | 30° |
| 17-5 | CA-13 | 1 | IPA/water (90/10) | 12% | 70° |
| 17-6 | CA-13 | 1 | IPA/EtOH/water (70/25/5) | 9% | 80° |
| 17-7 | CA-11 | 1 | IPA (100) | 5% | 55° |
| 17-8 | CA-11 | 1 | IPA (100) | 20% | 60° |
| 17-9 | CA-11 | 1 | IPA (100) | 3% | 25° |

(Remarks)
IPA: isopropyl alcohol
EtOH: ethanol

| | Surface properties | | | | | | |
|---|---|---|---|---|---|---|---|
|  | Saponification depth | Degree of acetyl substitution at surface | C=O/C–O | C–C/C–O | O/C | P/C | Contact angle |
| 17-1 | 0.20 μm | 2.0 | 0.0 | 0.55 | 0.67 | 0.012 | 35° |
| 17-2 | 0.33 μm | 2.3 | 0.4 | 0.62 | 0.65 | 0.013 | 42° |
| 17-3 | 0.45 μm | 1.9 | 0.3 | 0.46 | 0.70 | 0.008 | 30° |
| 17-4 | 0.02 μm | 2.7 | 0.6 | 0.73 | 0.62 | 0.010 | 54° |
| 17-5 | 0.07 μm | 2.5 | 0.5 | 0.68 | 0.64 | 0.014 | 47° |
| 17-6 | 0.75 μm | 1.8 | 0.2 | 0.61 | 0.74 | 0.015 | 22° |
| 17-7 | 0.15 μm | 2.1 | 0.1 | 0.51 | 0.64 | 0.015 | 32° |
| 17-8 | 0.008 μm | 2.8 | 0.8 | 0.78 | 0.60 | 0.006 | 59° |
| 17-9 | 0.90 μm | 1.7 | 0.9 | 0.41 | 0.78 | 0.017 | 18° |

| | Adhesion | | | | Liquid crystal display | | | | |
|---|---|---|---|---|---|---|---|---|---|
|  | Peeled area of anisotropic layer (testing condition) | | Undesirable brilliant points (sizing condition) | | Ratio of fogged area (storage condition) | | Viewing angle | | |
|  | 25° C. 10% RH | 25° C. 60% RH | 25° C. 10% RH | 25° C. 60% RH | 80° C. 30 days | 50° C. 30 days | Upward | Downward | Left-right ward |
| 17-1 | 0 | 0 | 0 | 0 | 0 | 0 | 66° | 36° | 140° |
| 17-2 | 0 | 0 | 0 | 0 | 0 | 0 | 65° | 34° | 140° |
| 17-3 | 0 | 0 | 0 | 0 | 0 | 0 | 64° | 35° | 140° |
| 17-4 | 2 | 0 | 0 | 0 | 0 | 0 | 66° | 35° | 140° |
| 17-5 | 0 | 0 | 0 | 0 | 0 | 0 | 65° | 35° | 142° |
| 17-6 | 4 | 0 | 0 | 0 | 0 | 0 | 64° | 35° | 139° |
| 17-7 | 0 | 0 | 0 | 0 | 0 | 0 | 65° | 36° | 141° |
| 17-8 | 15 | 3 | 23 | 3 | 11 | 3 | 61° | 30° | 130° |
| 17-9 | 22 | 5 | 46 | 5 | 14 | 5 | 60° | 30° | 130° |

EXAMPLE 18

(Preparation of Cellulose Ester Film)

A dope consisting of the following components was prepared. Each component was gradually added and stirred well in the following mixed solvent, and left at room temperature (25° C.) for 3 hours to swell the cellulose acetate. The obtained swollen mixture was placed in a mixing tank equipped with a reflux condenser, and stirred at 50° C. to dissolve.

| Components of cellulose acetate solution | |
|---|---|
| Cellulose acetate (acetic acid content: 59%) | 120 weight parts |
| Triphenyl phosphate | 9.36 weight parts |
| Biphenyldiphenyl phosphate | 4.68 weight parts |
| Methylene chloride (first solvent) | 704 weight parts |
| Methanol (second solvent) | 61.2 weight parts |
| The retardation-increasing agent used In Example 10 | 1.20 weight parts |

The prepared solution (dope) was filtrated through filter paper (No. 244, Azumi Filter Paper Co.) and a filter of flannel, and was then sent to a pressure-die by means of a constant-pressure gear pump. From the pressure-die, the dope was cast with a band-casting machine (effective length: 6 m) onto a band cooled at 0° C. so that the resultant film after dried and stretched might have each thickness set forth in Table 8. The cast dope on the band was blown with air for 2 seconds to dry until the content of volatile component reached 50 wt. %. The formed film was peeled from the band, and stepwise dried at 100° C. for 3 minutes, at 130° C. for 5 minutes and at 160° C. for 5 minutes to evaporate the solvent while let to shrink freely. When the content of the remaining solvent reached 1% or less, side areas inner by 15 cm from the edges were trimmed. Further, knurls (height: 50 µm, width: 1 cm) were provided near the edges. Thus, a non-stretched cellulose acetate film CA-14 (width: 1.8 m, length: 3,000 m) was prepared. The wastes of the film produced in the trimming were pulverized and mixed with virgin cellulose acetate to reuse.

(The content of the reused cellulose acetate was 30 wt. % based on the total amount of cellulose acetate.)

(Longitudinal Stretching)

The prepared cellulose acetate film (CA-14) was trimmed to make the width 90 cm, and then brought into contact with four preheating rolls (diameter: 30 cm) heated at 50° C., 80° C., 110° C. and 130° C. successively in this order. After thus preheated, the film was sent into a thermostat set at 130° C. The film was then stretched with a pair of nip-rolls placed in an interval in the thermostat. Each nip-roll comprised a stainless roller (diameter: 15 cm) coated with hard chromium and a nipping roller (diameter: 5 cm) covered with rubber. In each nip-roll, the film was held between these rollers to transfer. The interval between the nip-rolls was set so that the distance between the centers of rolls might be 90 cm. The nip-rolls were rotated at different speeds so that the film might be stretched at a desired extension ratio. The prepared cellulose acetate film (CA-14) was thus stretched at each extension ratio shown in Table 8, to prepare each film. The transferring speed at the inlet was 8 m/minute. After stretched in the thermostat, the film was brought into contact with four cooling rolls (diameter: 30 cm) heated at 110° C., 90° C., 70° C. and 50° C. successively in this order, to cool gradually.

(Saponification Treatment and Formation of Orientation Layer and optically anisotropic Layer)

One surface of each prepared film was coated with 1.5 N KOH aqueous solution (alkaline solution) in the amount of 25 ml/m$^2$, and held at 25° C. for 5 seconds to saponify. The alkaline solution was then washed away with flowing water for 10 seconds, and the washed surface was blown with air at 25° C. to dry. The conditions of the saponification treatment such as oxygen gas concentration in the atmosphere, solvent components of the KOH solution, and temperature of the flowing water (washing water) are set forth in Table 8. Thus, cellulose acetate films used for the below-described optical compensatory sheets 18-1 to 18-5 were prepared. The surface properties of each cellulose acetate film were measured, and the results are set forth in Table 8.

On the saponified surface of each prepared cellulose acetate film, an orientation layer and an optically anisotropic layer were provided in the same manner as in Example 17. Thus, optical compensatory sheets 18-1 to 18-5 were produced.

The samples for testing the adhesions of all the sheets were prepared and evaluated in the same manner as in Example 17. The results are set forth in Table 8.

(Preparation of Circularly Polarizing Plate)

All the prepared optical compensatory sheets were immersed in 1.5 N NaOH aqueous solution (55° C.) for 2 minutes, neutralized with 0.5 N sulfuric acid, washed with flowing water, and dried.

On the cellulose acetate film-side surface of each compensatory sheet, a polarizing membrane (stretched polyvinyl alcohol film adsorbing iodine) was laminated with a polyvinyl alcohol adhesive. The polarizing membrane was placed so that the transmission axis of the membrane might be at 45° to the slow axis of the compensatory sheet. Thus, a circularly polarizing plate comprising each optical compensatory sheet was produced.

(Preparation of Liquid Crystal Display of Reflection Type)

A glass substrate having an ITO electrode and another glass substrate equipped with an aluminum reflective electrode having a finely roughed surface were prepared. On the electrode of each glass substrate, a polyimide orientation layer (SE-7992, Nissan Chemical Industries Ltd.) was formed and subjected to rubbing treatment. The substrates were laminated so that the polyimide orientation layers might face to each other, and a spacer of 2.5 µm was inserted between the substrates. The substrates were placed so that the rubbing directions of the orientation layers might be crossed at the angle of 117°. To the gap between the substrates, a liquid crystal compound (MLC-6252, Merck) was injected to form a liquid crystal layer. Thus, a liquid crystal cell of TN mode (twisted angle: 63°, Δnd: 198 nm) was produced.

Each above-prepared circularly polarizing plate was laminated with an adhesive on the glass substrate having the ITO electrode, and further a protective film having AR-treated surface was laminated thereon. Thus, a liquid crystal display of reflection type comprising each polarizing plate was prepared.

To each thus-prepared display of reflection type, voltage of a square wave 1 kHz was applied. The display was then observed with eyes, and thereby it was confirmed that an image of neutral gray was given without undesirable coloring in either white mode (1.5 V) or black mode (4.5 V). Further, while the display was displaying a black image, how much undesirable brilliant points were seen within a square with sides of 10 cm was counted in a dark room. The result was shown in Table 8. The number of undesirable brilliant points is preferably 3 or less, and the compensatory sheets 18-1 to 18-3 gave no undesirable brilliant point.

The contrast ratio of reflection brightness was also measured by means of a meter (EZ-Contrast 160D, ELDIM), and thereby it was found that the front contrast ratio was 23.

The viewing angle giving the contrast ratio of 3 was shown in Table 8. In all the compensatory sheets 18-1 to 18-3, it was not less than 120° (up-downward) or not less than 120° (left-rightward). On the other hand, the viewing angles of the sheets 18-4 and 18-5 were approx. 60° or less in all directions.

Before the displays were prepared, all the prepared polarizing plates were left at 80° C. for 30 days (test for shelf life in long term). Independently, they were also left under a moderate condition, namely at 50° C. for 30 days. With each polarizing plate, the liquid crystal display was prepared. While each prepared display was giving a white image, it was observed by the eyes to confirm how much the displayed image was fogged. The fogs were evaluated in terms of the percent ratio (%) of fogged area based on the whole area of the image. The results are set forth in Table 8.

(Preparation of Liquid Crystal Display of Guest-Host Type)

On a glass substrate having an ITO transparent electrode, a polymer solution for forming a vertical orientation layer (LQ-1800, Hitachi-Du Pont Microsystems Co., Ltd.) was applied, dried and subjected to rubbing treatment.

The above-prepared circularly polarizing plate was laminated as a λ/4 plate with an adhesive on an aluminum-deposited glass substrate (reflection board). On the λ/4 plate, a SIO layer was formed with sputtering, and further thereon an ITO transparent electrode was provided. Furthermore thereon, a solution of the polymer for forming a vertical orientation layer (LQ-1800, Hitachi-Du Pont Microsystems Co., Ltd.) was applied, dried and subjected to rubbing treatment at the angle of 45° to the slow axis of the λ/4 plate.

The above-prepared two substrates were laminated so that the orientation layers might face to each other and so that the rubbing direction of the orientation layers might be anti-parallel, and a spacer of 7.6 μm was inserted between the substrates. To the gap between the substrates, a mixture consisting of 2.0 wt. % of dichromatic dye (NKX-1366, Japan Photosensitive Dyes Co., Ltd.) and 98.0 wt. % of liquid crystal compound (ZLI-2806, Merck) was injected according to the vacuum injection method, to form a liquid crystal layer. Thus, a liquid crystal display of guest-host type comprising each circularly polarizing plate was prepared.

Voltage of a square wave 1 kHz was applied between the ITO electrodes in each prepared guest-host type liquid crystal display of reflection type. The transmittances of the displays comprising the compensatory sheets 18-1 to 18-3 were measured in white mode (1 V) and black mode (10 V) to find 65% and 6%, respectively. Accordingly, the ratio of transmittances (contrast ratio) between the image in white mode (1 V) and that in black mode (10 V) was 11:1. The viewing angle giving the contrast ratio of 2:1 was measured to find 120° or more in both directions of up-down and left-right. Further, no undesirable brilliant point was observed in images given by the displays comprising the compensatory sheets 18-1 to 18-3. On the other hand, those comprising the sheet 18-4 and 18-5 gave images with 23 and 36 undesirable brilliant points, respectively. The transmittances were also measured while the voltage was changed, and thereby it was confirmed that hysteresis did not appear in the transmittance-voltage curve.

TABLE 8

| | Transparent support | Extension ratio | Thickness | Solvent (wt. %) | Saponification conditions Oxygen concentration | Temperature of washing water |
|---|---|---|---|---|---|---|
| 18-1 | CA-14 | 1.5 | 70 μm | IPA (100) | 3% | 60° C. |
| 18-2 | CA-14 | 1.4 | 40 μm | IPA/water (90/10) | 0% | 40° C. |
| 18-3 | CA-14 | 1.6 | 140 μm | IPA/EtOH (75/25) | 6% | 50° C. |
| 18-4 | CA-14 | 1.5 | 70 μm | IPA (100) | 18% | 30° C. |
| 18-5 | CA-14 | 1.5 | 70 μm | IPA (100) | 3% | 25° C. |

(Remarks)
IPA: isopropyl alcohol
EtOH: ethanol

| | Saponification depth | Degree of acetyl substitution at surface | Surface properties C=O/C—O | C—C/C—O | O/C | P/C | Contact angle |
|---|---|---|---|---|---|---|---|
| 18-1 | 0.22 μm | 2.0 | 0.0 | 0.53 | 0.67 | 0.011 | 36° |
| 18-2 | 0.31 μm | 2.2 | 0.4 | 0.60 | 0.64 | 0.013 | 40° |
| 18-3 | 0.14 μm | 1.9 | 0.3 | 0.48 | 0.69 | 0.009 | 31° |
| 18-4 | 0.007 μm | 2.9 | 0.8 | 0.79 | 0.59 | 0.005 | 60° |
| 18-5 | 0.92 μm | 1.6 | 0.9 | 0.40 | 0.79 | 0.019 | 16° |

| | Adhesion Peeled area of anisotropic layer (testing condition) | | Circularly polarizing plate (viewing angle) Direction | | Liquid crystal display Undesirable brilliant points (sizing condition) | | Ratio of fogged area (storage condition) | |
|---|---|---|---|---|---|---|---|---|
| | 25° C. 10% RH | 25° C. 60% RH | Up-downward | Left-rightward | 25° C., 10% RH | 25° C. 60% RH | 80° C. 30 days | 50° C. 30 days |
| 18-1 | 0 | 0 | 133° | 122° | 0 | 0 | 0 | 0 |
| 18-2 | 0 | 0 | 136° | 120° | 0 | 0 | 0 | 0 |
| 18-3 | 0 | 0 | 130° | 126° | 0 | 0 | 0 | 0 |
| 18-4 | 19 | 4 | 61° | 55° | 29 | 4 | 11 | 3 |
| 18-5 | 28 | 6 | 57° | 60° | 49 | 6 | 15 | 5 |

EXAMPLE 19

(Preparation of Optical Compensatory Sheet)

The following components were placed in a mixing tank, and then heated and stirred to dissolve. Thus, a cellulose acetate solution was prepared. The content of reused cellulose acetate was 30 wt. % based on the total amount of cellulose acetate.

| Components of cellulose acetate solution | |
|---|---|
| Cellulose acetate (acetic acid content: 60.9%) | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 300 weight parts |
| Methanol (second solvent) | 54 weight parts |
| 1-Butanol | 11 weight parts |

In another mixing tank, 16 weight parts of the retardation-increasing agent used in Example 10, 80 weight parts of methylene chloride and 20 weight parts of methanol were placed, heated and stirred to dissolve. Thus, a retardation-increasing agent solution was prepared.

The prepared retardation-increasing agent solution in the amount of 25 weight parts was added to 474 weight parts of the cellulose acetate solution, and stirred well to mix. The thus-prepared dope contained 3.5 weight parts of the retardation-increasing agent based on 100 weight parts of cellulose acetate.

The prepared dope was cast onto a film-forming band. After the dope cast on the band was heated at 100° C., the formed film was peeled to prepare a cellulose acetate film CA-15 (width: 1.8 m, thickness: 130 µm) in which the solvent remained in the amount of 30 wt. %. The film was not wound up, but both ends of the film were held with chucks and laterally stretched by means of a tenter in the following manner.

First, the film was preheated in a preheating zone at 130° C. for 30 seconds. The film was then laterally stretched at 130° C. for 30 seconds in the extension ratio of 1.25, and further stretched by widening the tenter so that the extension ratio might be each value shown in Table 9. Each film stretched in each extension ratio was subjected to heating treatment at 130° C. for 30 seconds while the tenter was narrowed so that the extension ratio might be decreased by 2% (namely, so that the width of tenter might be at the extension ratio×0.98). After the film was released from the chucks, both sides of the film were trimmed. The trimmed film was then transferred by means of rolls into a drying zone heated at 160° C., where the film was dried until the content of the remaining solvent reached 2 wt. % or less. After each side of the film was knurled in the same manner as in Example 17, the film was wound up into a roll.

(Saponification Treatment and Formation of Orientation Layer and Optically Anisotropic Layer)

One surface of each prepared cellulose acetate film was coated with 1.5 N KOH aqueous solution (alkaline solution) in the amount of 25 ml/m², and held at 25° C. for 5 seconds to saponify. The alkaline solution was then washed away with flowing water for 10 seconds, and the washed surface was blown with air at 25° C. to dry. The conditions of the saponification treatment such as oxygen gas concentration in the atmosphere, solvent components of the KOH solution, and temperature of the flowing water (washing water) are set forth in Table 9. Thus, cellulose acetate films used for the below-described optical compensatory sheets 19-1 to 19-5 were prepared. The surface properties of each cellulose acetate film were measured, and the results are set forth in Table 9.

On the saponified surface of each prepared cellulose acetate film, an orientation layer and an optically anisotropic layer were provided in the same manner as in Example 17. Thus, optical compensatory sheets 19-1 to 19-5 were produced.

The samples for testing the adhesions of all the sheets were prepared and evaluated in the same manner as in Example 17. The results are set forth in Table 9.

(Preparation of Polarizing Plate)

All the optical compensatory sheets were immersed in 1.5 N NaOH aqueous solution (55° C.) for 2 minutes, neutralized with 0.5 N sulfuric acid, washed with flowing water, and dried.

On the cellulose acetate film-side surface of each compensatory sheet, a polarizing membrane (stretched polyvinyl alcohol film adsorbing iodine) was laminated with a polyvinyl alcohol adhesive. The polarizing membrane was placed so that the transmission axis of the membrane might be parallel to the slow axis of the compensatory sheet. The angle between the transmission axis of the membrane and the slow axis of the compensatory sheet was 0.5° on average.

On the opposite surface of each compensatory sheet, a commercially available cellulose acetate film (Fujitac TD80UF, Fuji Photo Film Co., Ltd.) saponified under the same conditions as those for the compensatory sheet 19-1 was laminated with the polyvinyl alcohol adhesive. Thus, a polarizing plate comprising each optical compensatory sheet was produced.

(Preparation of Liquid Crystal Display-1)

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, each prepared polarizing plate was laminated on each side of the cell with an adhesive so that the optical compensatory sheet might be on the liquid crystal cell side. The polarizing plate on the observer side was placed so that the transmission axis might be in the up-down direction, while the plate on the backlight side was placed so that the transmission axis might be in the left-right direction. Thus, the polarizing plates were arranged in cross-Nicol position.

With respect to each prepared liquid crystal display, the minimum viewing angle giving the contrast ratio of 10:1 in the vertical (up-downward) or horizontal (left-rightward) direction was measured by means of a measuring apparatus (EZ-Contrast 160D, ELDIM). The results are set forth in Table 9. Further, while the display was displaying a black image, how much undesirable brilliant points were seen was counted in a dark room. The results are also set forth in Table 9.

Before the displays were prepared, all the prepared polarizing plates were left at 80° C. for 30 days (test for shelf life in long term). Independently, they were also left under a moderate condition, namely at 50° C. for 30 days. With each polarizing plate, the liquid crystal display was prepared. While each prepared display was giving a white image, it was observed by the eyes to confirm how much the displayed image was fogged. The fogs were evaluated in terms of the percent ratio (%) of fogged area based on the whole area of the displayed image. The results are set forth in Table 9.

(Preparation of Liquid Crystal Display-2)

A pair of polarizing plates was removed from a commercially available liquid crystal display (6E-A3, Sharp Corporation), which had a liquid crystal cell of TN mode. In place of the removed members, each prepared polarizing plate was laminated on each side (each of the backlight side and the observer side) of the cell with an adhesive so that the optical compensatory sheet might be on the liquid crystal cell side. The polarizing plates were arranged (in O mode) so that the transmission axis of the plate on the observer side might be perpendicular to that of the plate on the backlight side.

With respect to each prepared liquid crystal display, the minimum viewing angle giving the contrast ratio of 10:1 in the vertical (up-downward) or horizontal (left-rightward) direction was measured by means of a measuring apparatus (EZ-Contrast 160D, ELDIM). The results are set forth in Table 9. Further, while the display was displaying a black image, how much undesirable brilliant points were seen was counted in a dark room. The results are also set forth in Table 9.

Before the displays were prepared, all the prepared polarizing plates were left at 80° C. for 30 days (test for shelf life in long term). Independently, they were also left under a moderate condition, namely at 50° C. for 30 days. With each polarizing plate, the liquid crystal display was prepared. While each prepared display was giving a white image, it was observed by the eyes to confirm how much the displayed image was fogged. The fogs were evaluated in terms of the percent ratio (%) of fogged area based on the whole area of the displayed image. The results are set forth in Table 9.

[Evaluation of Unevenness of Displaying]

Images given by the liquid crystal displays prepared in Examples 17 to 19 were observed with the eyes. As a result, no unevenness caused by the roughness of the film was observed, and thereby it was confirmed that the optical compensatory sheets of the invention had enough smooth surfaces to be used in liquid crystal displays.

TABLE 9

| | | | Saponification condition | | | Surface properties | | | | | | |
|---|---|---|---|---|---|---|---|---|---|---|---|---|
| | Transparent support | Extension ratio | Solvent (weight %) | Oxygen concentration | Temperature of washing water | Saponification depth | Degree of substitution at surface | C=O/C—O | C—C/C—O | O/C | P/C | Contact angle |
| 19-1 | CA-15 | 1.22 | IPA (100) | 2% | 55° C. | 0.14 μm | 2.1 | 0.0 | 0.55 | 0.66 | 0.011 | 36° |
| 19-2 | CA-15 | 1.15 | IPA/water (95/5) | 0% | 45° C. | 0.26 μm | 2.2 | 0.2 | 0.60 | 0.63 | 0.013 | 44° |
| 19-3 | CA-15 | 1.30 | IPA/EtOH/water (80/15/5) | 4% | 60° C. | 0.21 μm | 1.8 | 0.1 | 0.49 | 0.70 | 0.008 | 30° |
| 19-4 | CA-15 | 1.22 | IPA (100) | 21% | 60° C. | 0.006 μm | 2.9 | 0.9 | 0.81 | 0.59 | 0.005 | 61° |
| 19-5 | CA-15 | 1.22 | IPA (100) | 3% | 18° C. | 0.98 μm | 1.5 | 0.8 | 0.37 | 0.80 | 0.019 | 16° |

(Remarks)
IPA: isopropyl alcohol
EtOH: ethanol

| | Adhesion | | | Liquid crystal display-1 | | | | Liquid crystal display-2 | | | | |
|---|---|---|---|---|---|---|---|---|---|---|---|---|
| | Peeled area of anisotropic layer (testing condition) | | | Undesirable brilliant points (sizing condition) | | Ratio of fogged area (storage condition) | | | Undesirable brilliant points Sizing condition | | Fogs Storing condition | |
| | 25° C. 10% RH | 25° C. 60% RH | 25° C. 10% RH | 25° C. 60% RH | 80° C. 30 days | 50° C. 30 days | Viewing angle | 25° C., 10% RH | 25° C., 60% RH | 80° C., 30 days | 50° C., 30 days | Viewing angle |
| 19-1 | 0 | 0 | 0 | 0 | 0 | 0 | 158° | 0 | 0 | 0 | 0 | 100° |
| 19-2 | 0 | 0 | 0 | 0 | 0 | 0 | 162° | 0 | 0 | 0 | 0 | 110° |
| 19-3 | 0 | 0 | 0 | 0 | 0 | 0 | 155° | 0 | 0 | 0 | 0 | 105° |
| 19-4 | 19 | 3 | 22 | 3 | 16 | 3 | 79° | 28 | 4 | 12 | 2 | 70° |
| 19-5 | 29 | 4 | 42 | 4 | 14 | 3 | 77° | 40 | 5 | 16 | 3 | 65° |

The invention claimed is:

1. A process for preparation of an optical compensatory sheet comprising a cellulose ester film, an orientation layer and an optically anisotropic layer formed of liquid crystal molecules in this order, alignment of said liquid crystal molecules being fixed, wherein the process successively comprises the steps of: coating an alkaline solution selectively on only a surface of the cellulose ester film on which the orientation layer is to be provided, wherein the alkaline solution comprises a solvent comprising an alcohol, and wherein the amount of water contained in the solvent is 0 to 15 wt. %; washing the surface to remove the alkaline solution; coating a coating solution of the orientation layer on the washed surface; drying the coating solution to form the orientation layer; forming the optically anisotropic layer comprising the liquid crystal molecules; and fixing alignment of the liquid crystal molecules.

2. The process as defined in claim 1, wherein the alkaline solution is coated on the surface under an atmosphere in which concentration of oxygen is 18% or less.

3. The process as defined in claim 1, wherein the surface is washed with water heated at 30 to 80° C.

4. The process as defined in claim 1, wherein the alcohol is isopropanol.

5. The process as defined in claim 1, wherein the alkaline solution is coated to form a saponified surface having a depth of saponification in the range of 0.01 to 0.8 μm.

* * * * *